(12) United States Patent
Zhu et al.

(10) Patent No.: US 11,072,231 B1
(45) Date of Patent: Jul. 27, 2021

(54) HYDRO-MECHANICAL HYBRID TRANSMISSION DEVICE AND CONTROL METHOD THEREOF

(71) Applicant: JIANGSU UNIVERSITY, Zhenjiang (CN)

(72) Inventors: Zhen Zhu, Zhenjiang (CN); Yingfeng Cai, Zhenjiang (CN); Long Chen, Zhenjiang (CN); Changgao Xia, Zhenjiang (CN); Jiangyi Han, Zhenjiang (CN); Xiang Tian, Zhenjiang (CN); Xiaodong Sun, Zhenjiang (CN); Longhui Lai, Zhenjiang (CN); Dehua Shi, Zhenjiang (CN); Chaochun Yuan, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/050,427

(22) PCT Filed: Dec. 4, 2019

(86) PCT No.: PCT/CN2019/122860
§ 371 (c)(1),
(2) Date: Oct. 23, 2020

(87) PCT Pub. No.: WO2021/088173
PCT Pub. Date: May 14, 2021

(30) Foreign Application Priority Data

Nov. 6, 2019 (CN) .......................... 201911076475.8

(51) Int. Cl.
*F16H 47/04* (2006.01)
*B60K 6/365* (2007.10)
*F16H 37/10* (2006.01)

(52) U.S. Cl.
CPC ............. *B60K 6/365* (2013.01); *F16H 47/04* (2013.01); *F16H 37/10* (2013.01);
(Continued)

(58) Field of Classification Search
None
See application file for complete search history.

(56) References Cited

U.S. PATENT DOCUMENTS

| 7,588,509 B1 | 9/2009 | Marsha |
| 10,955,038 B1 * | 3/2021 | Zhu ........................ B60K 6/365 |

FOREIGN PATENT DOCUMENTS

| CN | 107152511 A | 9/2017 |
| CN | 107869563 A | 4/2018 |

(Continued)

*Primary Examiner* — Dirk Wright
(74) *Attorney, Agent, or Firm* — Bayramoglu Law Offices LLC

(57) ABSTRACT

A hydro-mechanical hybrid transmission device and a control method thereof, including an input shaft, a split mechanism, a hydraulic transmission assembly, a mechanical transmission assembly, a convergence mechanism, and an output shaft, wherein the input shaft is connected, through the split mechanism, to the hydraulic transmission assembly and the mechanical transmission assembly, wherein the hydraulic transmission assembly and the mechanical transmission assembly are connected in parallel, and the hydraulic transmission assembly and the mechanical transmission assembly are each connected to the output shaft through the convergence mechanism. In the hydro-mechanical hybrid transmission device, planetary gear structures are combined with engagement/disengagement of brakes and clutches, to implement switching of power split and convergence structural forms.

7 Claims, 19 Drawing Sheets

(52) U.S. Cl.
  CPC .. *F16H 2037/101* (2013.01); *F16H 2047/045* (2013.01); *F16H 2200/2012* (2013.01)

(56) References Cited

FOREIGN PATENT DOCUMENTS

| | | |
|---|---|---|
| CN | 109185417 A | 1/2019 |
| CN | 109723789 A | 5/2019 |
| CN | 109764107 A | 5/2019 |
| JP | S58102849 A | 6/1983 |
| JP | 2008039016 A | 2/2008 |

\* cited by examiner

| Direction | Mode | Gear | B1 | B2 | B3 | B4 | B5 | B6 | C1 | C2 | C3 | C4 | C5 | C6 | C7 | F1 | F2 | F3 |
|---|---|---|---|---|---|---|---|---|---|---|---|---|---|---|---|---|---|---|
| Forward | Hydraulic | Forward hydraulic gear | △ | ▲ | △ | △ | △ | △ | ▲ | ▲ | △ | ▲ | △ | △ | ▲ | △ | △ | △ |
| | Hydro-mechanical transmission split | Split gear-1 | △ | △ | △ | ▲ | △ | △ | ▲ | ▲ | △ | △ | △ | ▲ | ▲ | △ | ▲ | △ |
| | | Split gear-2 | △ | △ | △ | ▲ | △ | △ | ▲ | ▲ | △ | ▲ | △ | △ | ▲ | △ | △ | △ |
| | | Split gear-3 | △ | △ | △ | △ | △ | △ | ▲ | ▲ | △ | ▲ | ▲ | △ | ▲ | △ | △ | △ |
| | | Split gear-4 | △ | ▲ | △ | △ | △ | △ | ▲ | ▲ | △ | △ | △ | ▲ | ▲ | △ | ▲ | △ |
| | Mechanical | Mechanical gear-1 | ▲ | △ | △ | △ | ▲ | ▲ | △ | △ | △ | △ | △ | ▲ | △ | △ | ▲ | ▲ |
| | | Mechanical gear-2 | ▲ | △ | △ | △ | ▲ | ▲ | △ | △ | △ | ▲ | △ | △ | △ | △ | △ | ▲ |
| | | Mechanical gear-3 | ▲ | △ | △ | △ | ▲ | △ | △ | △ | △ | ▲ | ▲ | △ | ▲ | △ | △ | ▲ |
| | | Mechanical gear-4 | ▲ | △ | ▲ | △ | △ | ▲ | △ | △ | △ | ▲ | △ | △ | △ | △ | △ | △ |
| Reverse | Hydraulic | Reverse hydraulic gear | △ | △ | △ | △ | △ | △ | ▲ | ▲ | ▲ | △ | △ | △ | ▲ | △ | △ | △ |
| | Hydro-mechanical transmission convergence | Convergence gear-1 | △ | △ | △ | ▲ | △ | △ | ▲ | ▲ | ▲ | △ | △ | ▲ | △ | △ | ▲ | △ |
| | | Convergence gear-2 | △ | △ | △ | ▲ | △ | △ | ▲ | ▲ | ▲ | ▲ | △ | △ | △ | △ | △ | △ |
| | | Convergence gear-3 | △ | △ | △ | △ | △ | △ | ▲ | ▲ | ▲ | ▲ | ▲ | △ | △ | ▲ | △ | △ |
| | | Convergence gear-4 | △ | ▲ | △ | △ | △ | △ | ▲ | ▲ | ▲ | △ | △ | ▲ | △ | △ | ▲ | △ |
| | Mechanical | Mechanical reverse gear | ▲ | ▲ | △ | △ | △ | ▲ | △ | △ | △ | △ | △ | ▲ | △ | △ | ▲ | △ |

Note: 1. B stands for brake, C stands for clutch, and F stands for one-way clutch;

2. ▲ stands for engagement of a gear-shift component, and △ stands for disengagement of a gear-shift component.

FIG. 2

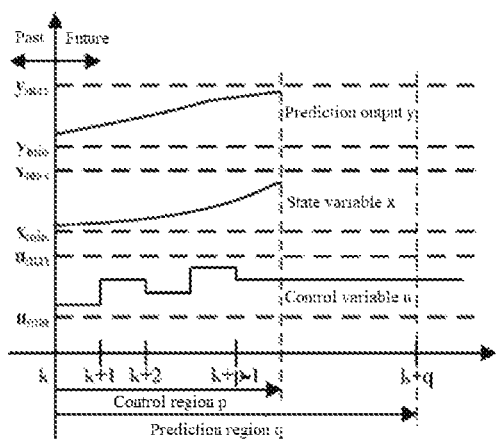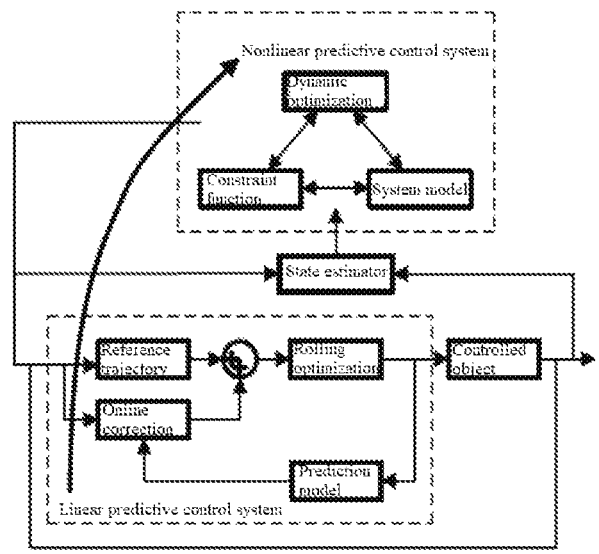
(a) The principle of vehicle predictive control based on time domain
(b) The structures of predictive control systems
FIG. 18

HYDRO-MECHANICAL HYBRID TRANSMISSION DEVICE AND CONTROL METHOD THEREOF

CROSS REFERENCE TO THE RELATED APPLICATIONS

This application is the national stage entry of International Application No. PCT/CN2019/122860, filed on Dec. 4, 2019, which is based upon and claims priority to Chinese Patent Application No. 201911076475.8, filed on Nov. 6, 2019, the entire contents of which are incorporated herein by reference.

TECHNICAL FIELD

The present invention relates to a transmission device and a control method thereof, and in particular, to a hydro-mechanical hybrid transmission device enabling both power split and convergence in each power range and a control method thereof.

BACKGROUND

High-power engineering vehicles work in harsh environments and bear variable loads, raising a high requirement on the adaptability of the variable-speed transmission system. Hence, the variable-speed transmission device needs to operate at different rotation speeds and torques to adapt to different working conditions in a timely manner, thereby ensuring the power performance and fuel economy of running vehicles. Hydraulic transmission enables flexible startup, hydro-mechanical transmission enables stepless speed regulation, and mechanical transmission enables efficient speed variation, which can meet the requirements of working conditions for startup, operation, and transfer respectively. At present, hybrid transmission devices that integrate hydraulic, hydro-mechanical, and mechanical transmission modes are rare, let alone hybrid transmission devices enabling both power split and convergence.

Two conventional hydro-mechanical transmission modes are: (1) a power-split transmission mode of using planetary gears as split mechanisms and ordinary gears as convergence mechanisms; (2) a power-convergence transmission mode using ordinary gears as split mechanisms and planetary gears as convergence mechanisms. Currently, hydro-mechanical transmission is designed based on the idea of sacrificing the transmission efficiency and speed regulation range of secondary working areas for efficient transmission in major working areas, and it is difficult for the conventional design to take into account the transmission requirements of various working conditions including direction change and mode switching.

When implementing forward transmission and reverse transmission, the conventional transmission device has limited power split and convergence structural forms and can hardly enable both, which is not conducive to the optimization of structural parameters and may easily cause circulating power, thereby reducing the transmission efficiency. Multi-mode transmission devices generally have a few gears to choose from in each mode, and cannot meet the requirements of complex working conditions.

The overall design of mechanical-electrical-hydraulic integration not only involves the performance of the transmission device, but also involves the matching of engine-transmission device-travel device, and then develops to the integration of man-machine-environment. As for the transmission device, the control of rotation speed and torque focuses on the adjustment of the transmission ratio; as for engine-transmission device-travel device, it involves the selection of transmission mode and the shift of gears in the transmission mode, as well as adaptive optimization control of the energy management system and so on; as for the integration of man-machine-environment, it involves the online optimal control problem of a bounded region.

SUMMARY

Objective of the invention: The objective of the present invention is to provide a hydro-mechanical hybrid transmission device and a control method thereof to solve the above problems. The present invention implements forward transmission and reverse transmission by using power split and convergence combined structural forms, which is conducive to the optimization of structural parameters and improves the system efficiency.

Technical solution: A hydro-mechanical hybrid transmission device includes an input shaft, a split mechanism, a hydraulic transmission assembly, a mechanical transmission assembly, a convergence mechanism, and an output shaft, wherein the input shaft is connected, through the split mechanism, to the hydraulic transmission assembly and the mechanical transmission assembly that are connected in parallel, and the hydraulic transmission assembly and the mechanical transmission assembly are each connected to the output shaft through the convergence mechanism; the split mechanism includes a clutch $C_3$, a split mechanism sun gear, a split mechanism planet carrier, a split mechanism ring gear, and a brake $B_1$, the clutch $C_3$ is connected to the split mechanism sun gear and the split mechanism planet carrier, the brake $B_1$ is connected to the split mechanism ring gear, the input shaft is connected to the split mechanism sun gear, the split mechanism is connected to the hydraulic transmission assembly through the split mechanism ring gear, and the split mechanism is connected to the mechanical transmission assembly through the split mechanism sun gear and the split mechanism planet carrier;

the convergence mechanism includes a brake $B_6$, a convergence mechanism ring gear, a convergence mechanism planet carrier, a convergence mechanism sun gear, and a clutch $C_7$, the brake $B_6$ is connected to the convergence mechanism ring gear, the clutch $C_7$ is connected to the convergence mechanism planet carrier and the convergence mechanism sun gear, the convergence mechanism is connected to the hydraulic transmission assembly through the convergence mechanism ring gear, the convergence mechanism is connected to the mechanical transmission assembly through the convergence mechanism sun gear, and the convergence mechanism is connected to the output shaft through the convergence mechanism planet carrier and the convergence mechanism sun gear.

In the present invention, planetary gear structures are combined with engagement/disengagement of brakes and clutches, to implement switching of power split and convergence structural forms. Therefore, during forward transmission and reverse transmission, power split and convergence structural forms are diversified and both can be enabled, which is conducive to the optimization of structural parameters and prevents circulating power, thereby improving the transmission efficiency. Multi-mode transmission devices are provided with various gears to choose from, and can meet the requirements of complex working conditions.

Preferably, to ensure the reliability of the hydraulic transmission assembly, the hydraulic transmission assembly includes a hydraulic transmission input clutch $C_1$, a hydraulic transmission input gear pair, a unidirectional variable pump, a hydraulic pipe, a unidirectional quantitative motor, a reverse gear pair, a hydraulic transmission output gear pair, and a hydraulic transmission output clutch $C_2$, the unidirectional variable pump is connected to the split mechanism through the hydraulic transmission input gear pair, the hydraulic transmission input clutch $C_1$ is arranged between the hydraulic transmission input gear pair and the unidirectional variable pump, the unidirectional variable pump is connected to the unidirectional quantitative motor through the hydraulic pipe, the unidirectional quantitative motor is connected to the convergence mechanism sequentially through the hydraulic transmission output gear pair and the reverse gear pair, and the hydraulic transmission output clutch $C_2$ is arranged between the unidirectional quantitative motor and the hydraulic transmission output gear pair.

Preferably, to ensure the reliability of mechanical transmission, the mechanical transmission assembly includes a front-set sun gear, a front-set planet carrier, a front-set ring gear, a rear-set sun gear, a rear-set planet carrier, a rear-set ring gear, a clutch $C_4$, a clutch $C_5$, a clutch $C_6$, a brake $B_2$, a brake $B_3$, a brake $B_4$, a brake $B_5$, a one-way clutch $F_1$, a one-way clutch $F_2$, and a one-way clutch $F_3$;

the front-set sun gear is connected to the split mechanism through the clutch $C_5$ and the clutch $C_6$ that are connected in parallel, the one-way clutch $F_1$ is arranged between the clutch $C_5$ and the front-set sun gear, and the one-way clutch $F_2$ is arranged between the clutch $C_6$ and the front-set sun gear, the one-way clutch $F_1$ and the one-way clutch $F_2$ have opposite power conduction directions, and the front-set sun gear is also connected to the brake $B_3$;

the front-set planet carrier is connected to the split mechanism through the clutch $C_4$, the brake $B_2$ is arranged between the front-set planet carrier and the clutch $C_4$, and the front-set planet carrier is fixedly connected to the rear-set ring gear;

the front-set ring gear is connected to the rear-set planet carrier and the convergence mechanism;

the rear-set sun gear is connected to the brake $B_4$ and the brake $B_5$ that are connected in parallel, the one-way clutch $F_3$ is arranged between the rear-set sun gear and the brake $B_5$, and the brake direction of the one-way clutch $F_3$ is the rotation direction of the rear-set sun gear and is opposite to the rotation direction of the split mechanism planet carrier;

the rear-set planet carrier is connected to the front-set ring gear and the convergence mechanism;

the rear-set ring gear is connected to the front-set planet carrier and the split mechanism, and the brake $B_2$ and the clutch $C_4$ in parallel connection are arranged between the rear-set ring gear and the split mechanism.

Preferably, to ensure that multiple gears are available for selection, three types of transmission in two directions, namely, pure hydraulic transmission, hydro-mechanical hybrid transmission, and pure mechanical transmission in forward transmission as well as pure hydraulic transmission, hydro-mechanical hybrid transmission, and pure mechanical transmission in reverse transmission are implemented through combination and engagement/disengagement of the brakes and the clutches.

Three types of forward transmission are as follows:

in forward pure hydraulic transmission, the brake $B_2$, the hydraulic transmission input clutch $C_1$, the hydraulic transmission output clutch $C_2$, the clutch $C_4$, and the clutch $C_7$ are engaged, while the other brakes and clutches are disengaged; when the brake $B_2$ and the clutch $C_4$ are engaged, the split mechanism planet carrier is locked, the split mechanism sun gear and the split mechanism ring gear rotate in opposite directions, and power passes through the input shaft, the split mechanism, the hydraulic transmission assembly, and the convergence mechanism and is output from the output shaft; when the clutch $C_7$ is engaged, the convergence mechanism planet carrier and the convergence mechanism sun gear of the convergence mechanism are interlocked, the entire convergence mechanism rotates, and by the action of the reverse gear pair, the input shaft and the output shaft rotate in the same direction;

in forward pure mechanical transmission, the brake $B_1$ and the brake $B_6$ are engaged, while the brake $B_2$, the brake $B_4$, the hydraulic transmission input clutch $C_1$, the hydraulic transmission output clutch $C_2$, the clutch $C_3$, and the clutch $C_7$ are disengaged; power passes through the input shaft, the split mechanism, the mechanical transmission assembly, and the convergence mechanism and is output from the output shaft; when the brake $B_1$ is engaged, the split mechanism ring gear is locked, and the split mechanism sun gear and the split mechanism planet carrier transmit power as gear transmission mechanisms; when the brake $B_6$ is engaged, the convergence mechanism ring gear is locked, and power passes through the convergence mechanism sun gear and the convergence mechanism planet carrier to the output shaft;

in forward hydro-mechanical hybrid transmission, the hydraulic transmission input clutch $C_1$, the hydraulic transmission output clutch $C_2$, and the clutch $C_7$ are engaged, while the brake $B_1$, the brake $B_3$, the brake $B_5$, the brake $B_6$, the clutch $C_3$, and the one-way clutch $F_3$ are disengaged; power passes through the input shaft to the split mechanism, transmitted by the split mechanism to the hydraulic transmission assembly and the mechanical transmission assembly respectively, then converged by the convergence mechanism, and output from the output shaft; when the clutch $C_3$ is disengaged, the split mechanism planet carrier transmits a part of the power from the input shaft to the mechanical transmission assembly, and the split mechanism ring gear transmits the other part of the power from the input shaft to the hydraulic transmission assembly; when the clutch $C_7$ is engaged, the power in the mechanical transmission assembly passes through the convergence mechanism sun gear and the convergence mechanism planet carrier and is transmitted to the output shaft, the power in the hydraulic transmission assembly passes through the convergence mechanism ring gear and the convergence mechanism planet carrier and is transmitted to the output shaft, and the convergence mechanism planet carrier rotates in the same direction as the input shaft within a set displacement ratio range.

Three types of reverse transmission are as follows:

in reverse pure hydraulic transmission, the hydraulic transmission input clutch $C_1$, the hydraulic transmission output clutch $C_2$, the clutch $C_3$, and the clutch $C_7$ are engaged, while the other brakes and clutches are disengaged; when the clutch $C_3$ is engaged, the split mechanism sun gear and the split mechanism planet carrier are interlocked, the entire split mechanism rotates, and power passes through the input shaft, the split mechanism, the hydraulic transmission assembly, and the convergence mechanism and is output from the output shaft; when the clutch $C_7$ is engaged, the convergence mechanism planet carrier and the convergence mechanism sun gear of the convergence mechanism are interlocked, the entire convergence mechanism rotates, and the input shaft and the output shaft rotate in opposite directions;

in reverse pure mechanical transmission, the brake $B_1$, the brake $B_2$, the brake $B_6$, the clutch $C_6$, and the one-way clutch $F_2$ are engaged, while the other brakes and clutches are disengaged;

when the brake $B_1$ is engaged, the split mechanism ring gear is locked, and power passes through the split mechanism sun gear and the split mechanism planet carrier and is transmitted to the mechanical transmission assembly; when the clutch $C_6$ and the one-way clutch $F_2$ are engaged, the power in the mechanical transmission assembly sequentially passes through the clutch $C_6$, the one-way clutch $F_2$, the front-set sun gear, and the front-set ring gear, and is then transmitted to the convergence mechanism sun gear; when the brake $B_6$ is engaged, the convergence mechanism ring gear is locked, and power passes through the convergence mechanism sun gear and the convergence mechanism planet carrier to the output shaft;

in reverse hydro-mechanical hybrid transmission, the hydraulic transmission input clutch $C_1$, the hydraulic transmission output clutch $C_2$, and the clutch $C_3$ are engaged, while the brake $B_1$, the brake $B_3$, the brake $B_5$, the brake $B_6$, the clutch $C_7$, and the one-way clutch $F_3$ are disengaged; power passes through the input shaft to the split mechanism, transmitted by the split mechanism to the hydraulic transmission assembly and the mechanical transmission assembly respectively, then converged by the convergence mechanism, and output from the output shaft; when the clutch $C_3$ is engaged, the split mechanism planet carrier transmits a part of the power from the input shaft to the mechanical transmission assembly, and the split mechanism ring gear transmits the other part of the power from the input shaft to the hydraulic transmission assembly; when the clutch $C_7$ is disengaged, the power in the mechanical transmission assembly passes through the convergence mechanism sun gear and the convergence mechanism planet carrier and is transmitted to the output shaft, the power in the hydraulic transmission assembly passes through the convergence mechanism ring gear and the convergence mechanism planet carrier and is transmitted to the output shaft, and the convergence mechanism planet carrier rotates in a direction opposite to the input shaft within a set displacement ratio range.

Preferably, to further ensure that forward mechanical transmission gears are available for selection, the forward pure mechanical transmission includes mechanical gear-1, mechanical gear-2, mechanical gear-3, and mechanical gear-4, specifically implemented as follows:

in mechanical gear-1, the brake $B_5$, the one-way clutch $F_3$, the clutch $C_6$, and the one-way clutch $F_2$ are engaged, while the brake $B_3$, the clutch $C_4$, the clutch $C_5$, and the one-way clutch $F_1$ are disengaged; power sequentially passes through the clutch $C_6$, the one-way clutch $F_2$, and the front-set sun gear to the front-set planet carrier, and is split at the front-set planet carrier into the front-set ring gear and the rear-set ring gear respectively; the power in the rear-set ring gear passes through the rear-set planet carrier and is converged with the power in the front-set ring gear, and the power is then transmitted to the convergence mechanism; when the brake $B_5$ and the one-way clutch $F_3$ are engaged, the rear-set sun gear is locked;

in mechanical gear-2, the brake $B_5$, the one-way clutch $F_3$, and the clutch $C_4$ are engaged, while the brake $B_3$, the clutch $C_5$, the clutch $C_6$, the one-way clutch $F_1$, and the one-way clutch $F_2$ are disengaged; power sequentially passes through the clutch $C_4$, the rear-set ring gear, and the rear-set planet carrier, and is then transmitted to the convergence mechanism; when the brake $B_5$ and the one-way clutch $F_3$ are engaged, the rear-set sun gear is locked;

in mechanical gear-3, the brake $B_5$, the clutch $C_4$, the clutch $C_5$, the one-way clutch $F_1$, and the one-way clutch $F_3$ are engaged, while the brake $B_3$, the clutch $C_6$, and the one-way clutch $F_2$ are disengaged; power sequentially passes through the clutch $C_4$, the front-set planet carrier, and the front-set ring gear, and is then transmitted to the convergence mechanism; since the clutch $C_5$ and the one-way clutch $F_1$ are engaged, the front-set sun gear is prevented from overspeed rotation and rotates at a speed consistent with the front-set planet carrier, enabling the entire front planetary gear set mechanism to rotate;

in mechanical gear-4, the brake $B_3$ and the clutch $C_4$ are engaged, while the brake $B_5$, the clutch $C_5$, the clutch $C_6$, the one-way clutch $F_1$, the one-way clutch $F_2$, and the one-way clutch $F_3$ are disengaged; power sequentially passes through the clutch $C_4$, the front-set planet carrier, and the front-set ring gear, and is then transmitted to the convergence mechanism.

Preferably, to increase forward hybrid transmission gears, the forward hydro-mechanical hybrid transmission includes hybrid transmission gear-1, hybrid transmission gear-2, hybrid transmission gear-3, and hybrid transmission gear-4, specifically implemented as follows:

in forward hybrid gear-1, the brake $B_4$, the clutch $C_6$, and the one-way clutch $F_2$ are engaged, while the brake $B_2$, the clutch $C_4$, the clutch $C_5$, and the one-way clutch $F_1$ are disengaged; the power in the mechanical transmission assembly sequentially passes through the clutch $C_6$, the one-way clutch $F_2$, and the front-set sun gear to the front-set planet carrier, and is split at the front-set planet carrier into the front-set ring gear and the rear-set ring gear respectively; the power in the rear-set ring gear passes through the rear-set planet carrier and is converged with the power in the front-set ring gear, and the power is then transmitted to the convergence mechanism; when the brake $B_4$ is engaged, the rear-set sun gear is locked;

in forward hybrid gear-2, the brake $B_4$ and the clutch $C_4$ are engaged, while the brake $B_2$, the clutch $C_5$, the clutch $C_6$, the one-way clutch $F_1$, and the one-way clutch $F_2$ are disengaged; the power in the mechanical transmission assembly sequentially passes through the clutch $C_4$, the rear-set ring gear, and the rear-set planet carrier, and is then transmitted to the convergence mechanism;

in forward hybrid gear-3, the clutch $C_4$, the clutch $C_5$, and the one-way clutch $F_1$ are engaged, while the brake $B_2$, the brake $B_4$, the clutch $C_6$, and the one-way clutch $F_2$ are disengaged; the power in the mechanical transmission assembly sequentially passes through the clutch $C_4$, the front-set planet carrier, and the front-set ring gear, and is then transmitted to the convergence mechanism; since the clutch $C_5$ and the one-way clutch $F_1$ are engaged, the front-set sun gear is prevented from overspeed rotation and rotates at a speed consistent with the front-set planet carrier, enabling the entire front planetary gear set mechanism to rotate;

in forward hybrid gear-4, the brake $B_2$, the clutch $C_6$, and the one-way clutch $F_2$ are engaged, while the brake $B_4$, the clutch $C_4$, the clutch $C_5$, and the one-way clutch $F_1$ are disengaged; the power in the mechanical transmission assembly sequentially passes through the clutch $C_6$, the one-way clutch $F_2$, the front-set sun gear, and the front-set ring gear, and is then transmitted to the convergence mechanism.

Preferably, to increase reverse hybrid transmission gears, the reverse hydro-mechanical hybrid transmission includes hybrid transmission gear-1, hybrid transmission gear-2, hybrid transmission gear-3, and hybrid transmission gear-4, specifically implemented as follows:

in reverse hybrid gear-1, the brake $B_4$, the clutch $C_6$, and the one-way clutch $F_2$ are engaged, while the brake $B_2$, the clutch $C_4$, the clutch $C_5$, and the one-way clutch $F_1$ are disengaged; the power in the mechanical transmission assembly sequentially passes through the clutch $C_6$, the one-way clutch $F_2$, and the front-set sun gear to the front-set planet carrier, and is split at the front-set planet carrier into the front-set ring gear and the rear-set ring gear respectively; the power in the rear-set ring gear passes through the rear-set planet carrier and is converged with the power in the front-set ring gear, and the power is then transmitted to the convergence mechanism; when the brake $B_4$ is engaged, the rear-set sun gear is locked;

in reverse hybrid gear-2, the brake $B_4$ and the clutch $C_4$ are engaged, while the brake $B_2$, the clutch $C_5$, the clutch $C_6$, the one-way clutch $F_1$, and the one-way clutch $F_2$ are disengaged; the power in the mechanical transmission assembly sequentially passes through the clutch $C_4$, the rear-set ring gear, and the rear-set planet carrier, and is then transmitted to the convergence mechanism;

in reverse hybrid gear-3, the clutch $C_4$, the clutch $C_5$, and the one-way clutch $F_1$ are engaged, while the brake $B_2$, the brake $B_4$, the clutch $C_6$, and the one-way clutch $F_2$ are disengaged; the power in the mechanical transmission assembly sequentially passes through the clutch $C_4$, the front-set planet carrier, and the front-set ring gear, and is then transmitted to the convergence mechanism; since the clutch $C_5$ and the one-way clutch $F_1$ are engaged, the front-set sun gear is prevented from overspeed rotation and rotates at a speed consistent with the front-set planet carrier, enabling the entire front planetary gear set mechanism to rotate;

in reverse hybrid gear-4, the brake $B_2$, the clutch $C_6$, and the one-way clutch $F_2$ are engaged, while the brake $B_4$, the clutch $C_4$, the clutch $C_5$, and the one-way clutch $F_1$ are disengaged; the power in the mechanical transmission assembly sequentially passes through the clutch $C_6$, the one-way clutch $F_2$, the front-set sun gear, and the front-set ring gear, and is then transmitted to the convergence mechanism.

Through model predictive control of the transmission system, the problem of globally optimal dynamic programming of fuel economy is transformed into the local optimization control problem in a prediction region, and the future vehicle operation status in the prediction region is continuously updated through rolling optimization, to obtain optimization results and realize real-time application of predictive control in the hydro-mechanical hybrid transmission system. Vehicle predictive control based on time domain is online rolling optimization control within the framework of model predictive control and implemented in combination with dynamic programming.

In a prediction region q, the state transition equation of vehicle predictive control in hybrid transmission is:

$$x(k+1)=\mu[x(k),u(k)]$$

wherein $\mu$ is a time-discrete system function, $x(k+1)$ is a state variable related to k+1, $x(k)$ is a state variable related to k, and $u(k)$ is a control variable related to k.

In the prediction region q, an objective function of minimizing the fuel consumption of the hybrid transmission system is:

wherein $J_1$ is an objective function of fuel economy when a linear predictive control system is adopted, $v_k$ is a stage indicator of the $k^{th}$ stage, $x_k$ is a state variable of the $k^{th}$ stage, $u_k$ is a control variable of the $k^{th}$ stage, $\Delta t$ is a time interval, $t(k)$ is a time point of the $k^{th}$ stage, and $t(k+q)$ is a time point of the $(k+q)^{th}$ stage.

In a control region p, a sensing device is generally adopted for measurement; and in the prediction region q, a GPS/GIS system is generally adopted for prediction. Prediction relies on the selection of an appropriate prediction window length for data collection as well as a high cost-performance ratio of the predictive control system.

A nonlinear predictive control system is adopted to control dynamic characteristics and state variables of the hybrid transmission system, constrain control variables, estimate future states, and solve the online optimal control problem of a bounded region.

In this case, the objective function of minimizing the fuel consumption of the hybrid transmission system is:

$$J_2 = \min \sum_{t=t(k)}^{t=t(k+q)} L[x(t), u(t)]$$

wherein $J_2$ is an objective function of fuel economy when a nonlinear predictive control system is adopted, L is an instantaneous fuel consumption function at a time point t, $x(t)$ is a state variable at a time point t, and $u(t)$ is a control variable at a time point t.

Beneficial effects: In the present invention, planetary gear structures are combined with engagement/disengagement of brakes and clutches, to implement switching of power split and convergence structural forms. Therefore, during forward transmission and reverse transmission, power split and convergence structural forms are diversified and both can be enabled, which is conducive to the optimization of structural parameters and prevents circulating power, thereby improving the transmission efficiency. Multi-mode transmission devices are provided with various gears to choose from, and can meet the requirements of complex working conditions. In each mechanical transmission gear, the one-way clutch may overrun and disables engine braking. In particular circumstances, the mechanical transmission system in the hydro-mechanical transmission mode can be directly used to replace the mechanical system in the mechanical transmission mode, to enable engine braking or improve the service life of the gear-shift components. The replacement of a two-way variable pump and a two-way quantitative motor with the unidirectional variable pump and the unidirectional quantitative motor largely reduces the production and maintenance costs.

BRIEF DESCRIPTION OF THE DRAWINGS

FIG. 2 is a table showing engagement/disengagement states of gear-shift components in the present invention;

FIG. 18 is a diagram showing the principle of vehicle predictive control; and

DETAILED DESCRIPTION OF THE EMBODIMENTS

The present invention is further described below with reference to the accompanying drawings.

Figure 1:
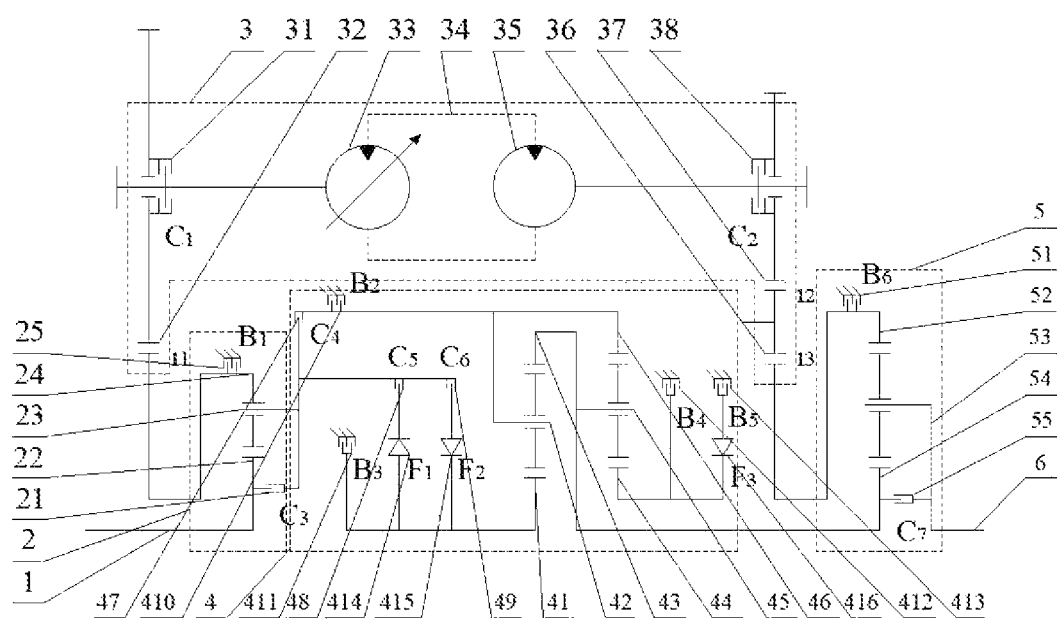
FIG. 1 is a schematic structural diagram of the present invention.

As shown in FIG. 1, a hydro-mechanical hybrid transmission device includes an input shaft 1, a split mechanism 2, a hydraulic transmission assembly 3, a mechanical transmission assembly 4, a convergence mechanism 5, and an output shaft 6. The input shaft 1 is connected, through the split mechanism 2, to the hydraulic transmission assembly 3 and the mechanical transmission assembly 4 that are connected in parallel. The hydraulic transmission assembly 3 and the mechanical transmission assembly 4 are each connected to the output shaft 6 through the convergence mechanism 5. The split mechanism 2 includes a clutch $C_3$ 21, a split mechanism sun gear 22, a split mechanism planet carrier 23, a split mechanism ring gear 24, and a brake $B_1$ 25. The clutch $C_3$ 21 is connected to the split mechanism sun gear 22 and the split mechanism planet carrier 23. The brake $B_1$ 25 is connected to the split mechanism ring gear 24. The input shaft 1 is connected to the split mechanism sun gear 22. The split mechanism 2 is connected to the hydraulic transmission assembly 3 through the split mechanism ring gear 24. The split mechanism 2 is connected to the mechanical transmission assembly 4 through the split mechanism sun gear 22 and the split mechanism planet carrier 23.

The convergence mechanism 5 includes a brake $B_6$ 51, a convergence mechanism ring gear 52, a convergence mechanism planet carrier 53, a convergence mechanism sun gear 54, and a clutch $C_7$ 55. The brake $B_6$ 51 is connected to the convergence mechanism ring gear 52. The clutch $C_7$ 55 is connected to the convergence mechanism planet carrier 53 and the convergence mechanism sun gear 54. The convergence mechanism 5 is connected to the hydraulic transmission assembly 3 through the convergence mechanism ring gear 52. The convergence mechanism 5 is connected to the mechanical transmission assembly 4 through the convergence mechanism sun gear 54. The convergence mechanism 5 is connected to the output shaft 6 through the convergence mechanism planet carrier 53 and the convergence mechanism sun gear 54.

The hydraulic transmission assembly 3 includes a hydraulic transmission input clutch $C_1$ 31, a hydraulic transmission input gear pair 32, a unidirectional variable pump 33, a hydraulic pipe 34, a unidirectional quantitative motor 35, a reverse gear pair 36, a hydraulic transmission output gear pair 37, and a hydraulic transmission output clutch $C_2$ 38. The unidirectional variable pump 33 is connected to the split mechanism 2 through the hydraulic transmission input gear pair 32. The hydraulic transmission input clutch $C_1$ 31 is arranged between the hydraulic transmission input gear pair 32 and the unidirectional variable pump 33. The unidirectional variable pump 33 is connected to the unidirectional quantitative motor 35 through the hydraulic pipe 34. The unidirectional quantitative motor 35 is connected to the convergence mechanism 5 sequentially through the hydraulic transmission output gear pair 37 and the reverse gear pair 36. The hydraulic transmission output clutch $C_2$ 38 is arranged between the unidirectional quantitative motor 35 and the hydraulic transmission output gear pair 37.

The mechanical transmission assembly 4 includes a front-set sun gear 41, a front-set planet carrier 42, a front-set ring gear 43, a rear-set sun gear 44, a rear-set planet carrier 45, a rear-set ring gear 46, a clutch $C_4$ 47, a clutch $C_5$ 48, a clutch $C_6$ 49, a brake $B_2$ 410, a brake $B_3$ 411, a brake $B_4$ 412, a brake $B_5$ 413, a one-way clutch $F_1$ 414, a one-way clutch $F_2$ 415, and a one-way clutch $F_3$ 416.

The front-set sun gear 41 is connected to the split mechanism 2 through the clutch $C_5$ 48 and the clutch $C_6$ 49 that are connected in parallel. The one-way clutch $F_1$ 414 is arranged between the clutch $C_5$ 48 and the front-set sun gear 41, and the one-way clutch $F_2$ 415 is arranged between the clutch $C_6$ 49 and the front-set sun gear 41. The one-way clutch $F_1$ 414 and the one-way clutch $F_2$ 415 have opposite power conduction directions. The front-set sun gear 41 is also connected to the brake $B_3$ 411.

The front-set planet carrier 42 is connected to the split mechanism 2 through the clutch $C_4$ 47. The brake $B_2$ 410 is arranged between the front-set planet carrier 42 and the clutch $C_4$ 47. The front-set planet carrier 42 is fixedly connected to the rear-set ring gear 46.

The front-set ring gear 43 is connected to the rear-set planet carrier 45 and the convergence mechanism 5.

The rear-set sun gear 44 is connected to the brake $B_4$ 412 and the brake $B_5$ 413 that are connected in parallel. The one-way clutch $F_3$ 416 is arranged between the rear-set sun gear 44 and the brake $B_5$ 413. The brake direction of the one-way clutch $F_3$ 416 is the rotation direction of the rear-set sun gear 44 and is opposite to the rotation direction of the split mechanism planet carrier 23.

The rear-set planet carrier 45 is connected to the front-set ring gear 43 and the convergence mechanism 5.

The rear-set ring gear 46 is connected to the front-set planet carrier 42 and the split mechanism 2. The brake $B_2$ 410 and the clutch $C_4$ 47 in parallel connection are arranged between the rear-set ring gear 46 and the split mechanism 2.

Figure 3:
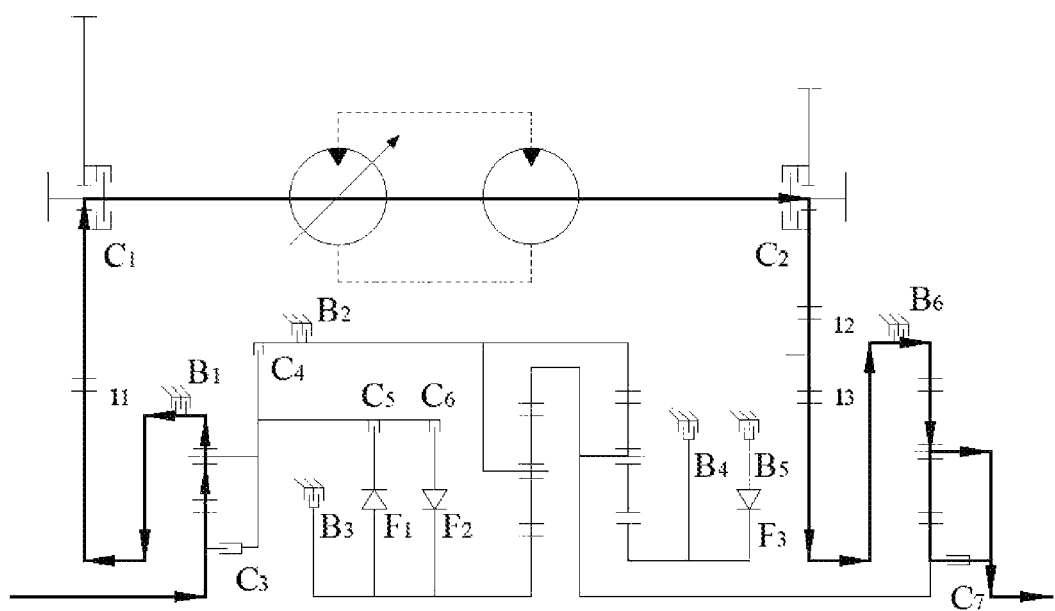
FIG. 3 is a schematic diagram showing the power flow in a forward pure hydraulic gear in the present invention.

As shown in FIG. 2 and FIG. 3, in forward pure hydraulic transmission, the brake $B_2$ 410, the hydraulic transmission input clutch $C_1$ 31, the hydraulic transmission output clutch $C_2$ 38, the clutch $C_4$ 47, and the clutch $C_7$ 55 are engaged, while the other brakes and clutches are disengaged. When the brake $B_2$ 410 and the clutch $C_4$ 47 are engaged, the split mechanism planet carrier 23 is locked to become a reverse gear, and power passes through the input shaft 1, the split mechanism 2, the hydraulic transmission assembly 3, and the convergence mechanism 5 and is output from the output shaft 6. When the clutch $C_7$ 55 is engaged, the convergence mechanism planet carrier 53 and the convergence mechanism sun gear 54 of the convergence mechanism 5 are interlocked, the entire convergence mechanism 5 rotates, and by the action of the reverse gear pair 36, the input shaft 1 and the output shaft 6 rotate in the same direction.

The rotation speeds of the input shaft 1 and the output shaft 6 are in the following relationship:

$$n_o = \frac{e}{k_1 i_1 i_2 i_3} n_I$$

wherein $n_o$ is the rotation speed of the output shaft 6, $n_1$ is the rotation speed of the input shaft 1, e is a ratio of the displacement of the variable pump 33 to the displacement of the quantitative motor 35, $i_1$, $i_2$, and $i_3$ are respectively transmission ratios of gears, and $k_1$ is a split mechanism characteristic parameter, if $k_1=2$ and $i_1 i_2 i_3=1$, $$n_o = \frac{e}{2} n_I;$$

when $e \in [0,1]$, $$n_0 \in \left[0, \frac{1}{2}\right] n_I.$$

Figure 4:
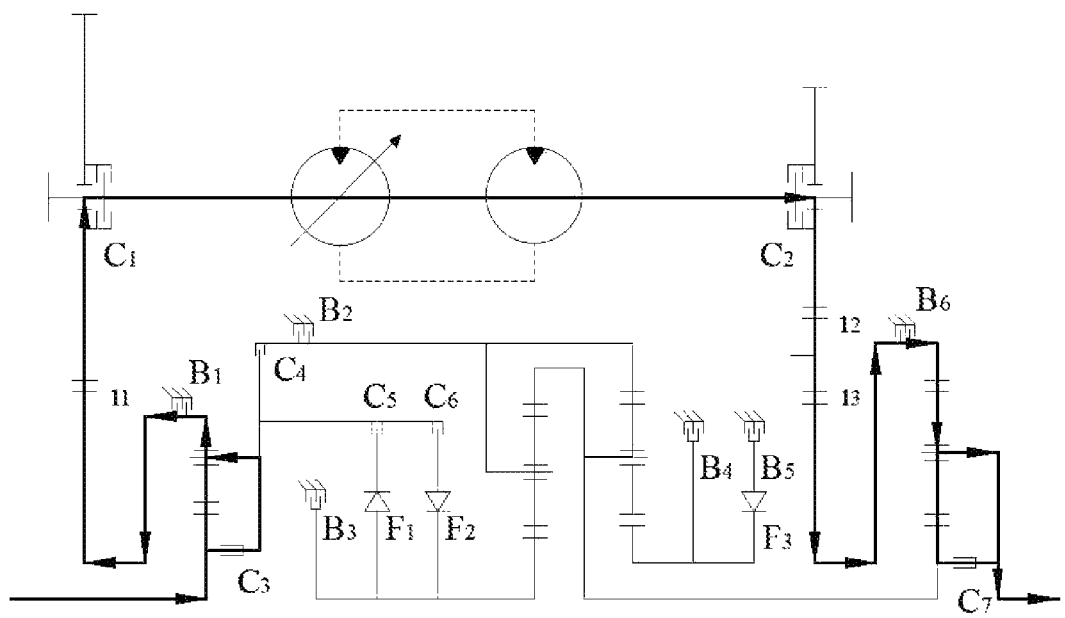
FIG. 4 is a schematic diagram showing the power flow in a reverse pure hydraulic gear in the present invention.

As shown in FIG. 2 and FIG. 4, in reverse pure hydraulic transmission, the hydraulic transmission input clutch $C_1$ 31, the hydraulic transmission output clutch $C_2$ 38, the clutch $C_3$ 21, and the clutch $C_7$ 55 are engaged, while the other brakes and clutches are disengaged. When the clutch $C_3$ 21 is engaged, the split mechanism sun gear 22 and the split mechanism planet carrier 23 are interlocked, the entire split mechanism 2 rotates, and power passes through the input shaft 1, the split mechanism 2, the hydraulic transmission assembly 3, and the convergence mechanism 5 and is output from the output shaft 6. When the clutch $C_7$ 55 is engaged, the convergence mechanism planet carrier 53 and the convergence mechanism sun gear 54 of the convergence mechanism 5 are interlocked, and the input shaft 1 and the output shaft 6 rotate in opposite directions.

The rotation speeds of the input shaft 1 and the output shaft 6 are in the following relationship:

$$n_o = -\frac{e}{i_1 i_2 i_3} n_I;$$

when $e \in [0,1]$, $n_0 \in [-1, 0] n_1$.

Figure 5:
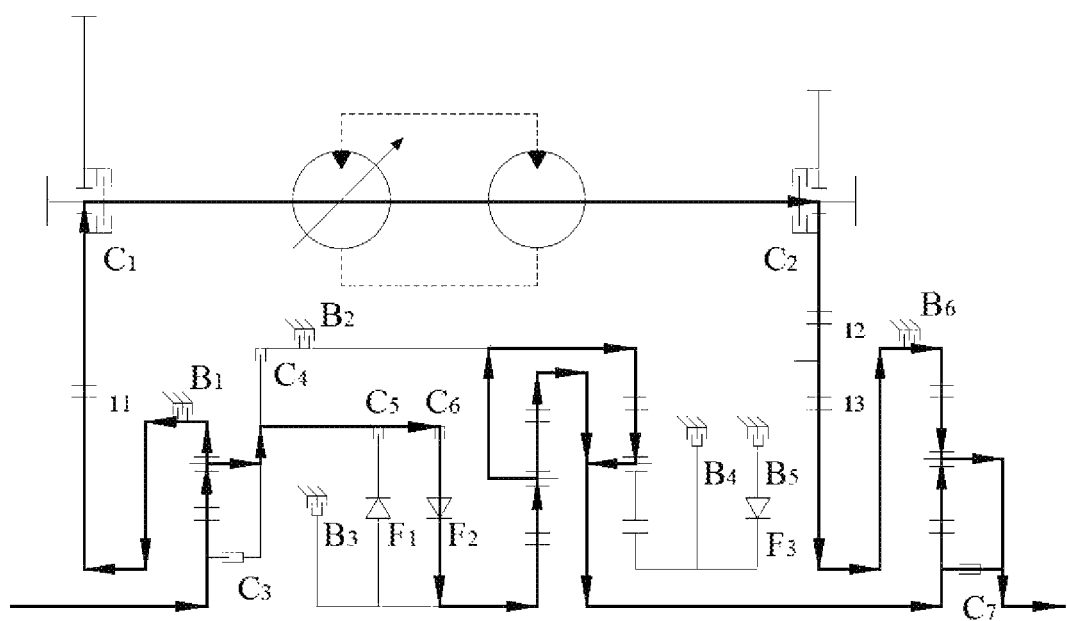
FIG. 5 is a schematic diagram showing the power flow in forward hydro-mechanical hybrid transmission gear-1 in the present invention.

As shown in FIG. 2 and FIG. 5, in forward hydro-mechanical hybrid transmission gear-1, the hydraulic transmission input clutch $C_1$ 31, the hydraulic transmission output clutch $C_2$ 38, and the clutch $C_7$ 55 are engaged, while the brake $B_1$ 25, the brake $B_3$ 411, the brake $B_5$ 413, the brake $B_6$ 51, the clutch $C_3$ 21, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is disengaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is engaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in the same direction as the input shaft 1 within a set displacement ratio range.

The brake $B_4$ 412, the clutch $C_6$ 49, and the one-way clutch $F_2$ 415 are engaged, while the brake $B_2$ 410, the clutch $C_4$ 47, the clutch $C_5$ 48, and the one-way clutch $F_1$ 414 are disengaged. The power in the mechanical transmission assembly 4 sequentially passes through the clutch $C_6$ 49, the one-way clutch $F_2$ 415, and the front-set sun gear 41 to the front-set planet carrier 42, and is split at the front-set planet carrier 42 into the front-set ring gear 43 and the rear-set ring gear 46 respectively. The power in the rear-set ring gear 46 passes through the rear-set planet carrier 45 and is converged with the power in the front-set ring gear 43, and the power is then transmitted to the convergence mechanism 5. When the brake $B_4$ 412 is engaged, the rear-set sun gear 44 is locked.

Figure 6:
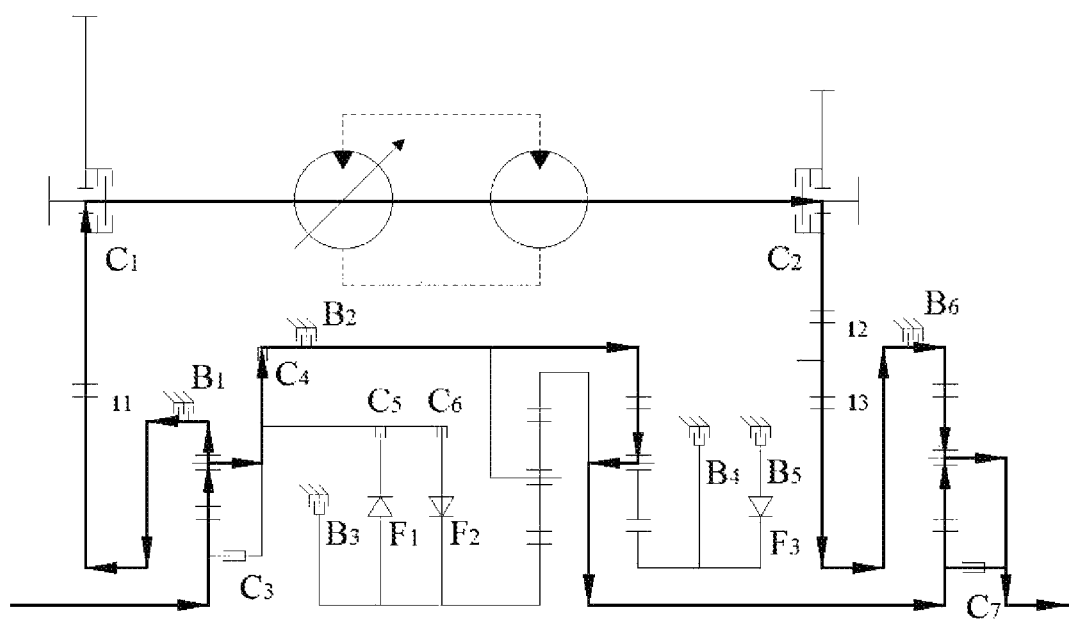
FIG. 6 is a schematic diagram showing the power flow in forward hydro-mechanical hybrid transmission gear-2 in the present invention.

As shown in FIG. 2 and FIG. 6, in forward hydro-mechanical hybrid transmission gear-2, the hydraulic transmission input clutch $C_1$ 31, the hydraulic transmission output clutch $C_2$ 38, and the clutch $C_7$ 55 are engaged, while the brake $B_1$ 25, the brake $B_3$ 411, the brake $B_5$ 413, the brake $B_6$ 51, the clutch $C_3$ 21, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is disengaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is engaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in the same direction as the input shaft 1 within a set displacement ratio range.

The brake $B_4$ 412 and the clutch $C_4$ 47 are engaged, while the brake $B_2$ 410, the clutch $C_5$ 48, the clutch $C_6$ 49, the one-way clutch $F_1$ 414, and the one-way clutch $F_2$ 415 are disengaged. The power in the mechanical transmission assembly 4 sequentially passes through the clutch $C_4$ 47, the rear-set ring gear 46, and the rear-set planet carrier 45, and is then transmitted to the convergence mechanism 5.

Figure 7:
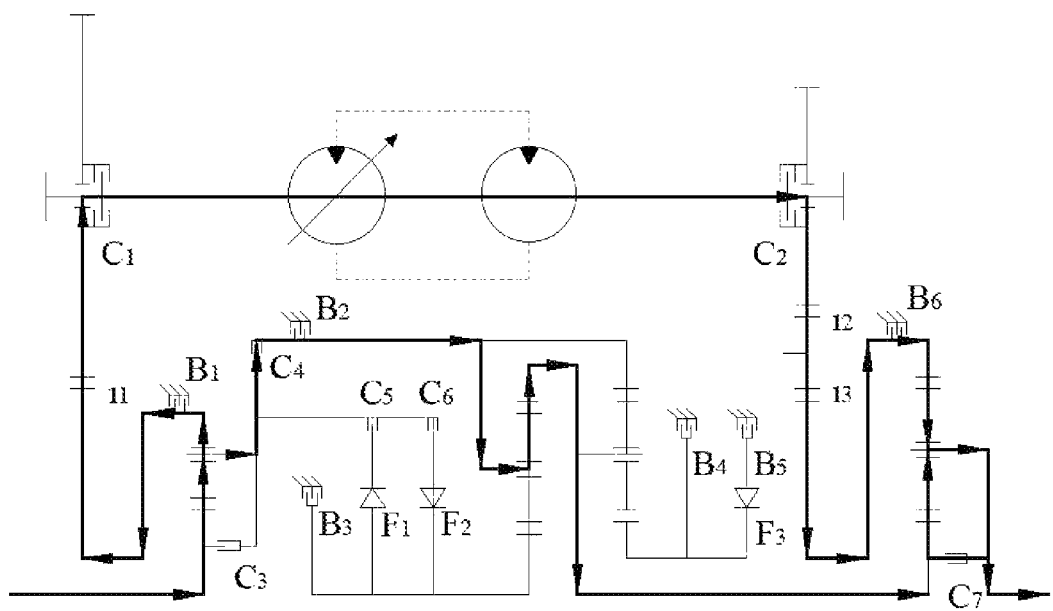
FIG. 7 is a schematic diagram showing the power flow in forward hydro-mechanical hybrid transmission gear-3 in the present invention.

As shown in FIG. 2 and FIG. 7, in forward hydro-mechanical hybrid transmission gear-3, the hydraulic transmission input clutch $C_1$ 31, the hydraulic transmission output clutch $C_2$ 38, and the clutch $C_7$ 55 are engaged, while the brake $B_1$ 25, the brake $B_3$ 411, the brake $B_5$ 413, the brake $B_6$ 51, the clutch $C_3$ 21, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is disengaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is engaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in the same direction as the input shaft 1 within a set displacement ratio range.

The clutch $C_4$ 47, the clutch $C_5$ 48, and the one-way clutch $F_1$ 414 are engaged, while the brake $B_2$ 410, the brake $B_4$ 412, the clutch $C_6$ 49, and the one-way clutch $F_2$ 415 are disengaged. The power in the mechanical transmission assembly 4 sequentially passes through the clutch $C_4$ 47, the front-set planet carrier 42, and the front-set ring gear 43, and is then transmitted to the convergence mechanism 5. Since the clutch $C_5$ 48 and the one-way clutch $F_1$ 414 are engaged, the front-set sun gear 41 is prevented from overspeed rotation and rotates at a speed consistent with the front-set planet carrier 42, enabling the entire front planetary gear set mechanism to rotate.

Figure 8:
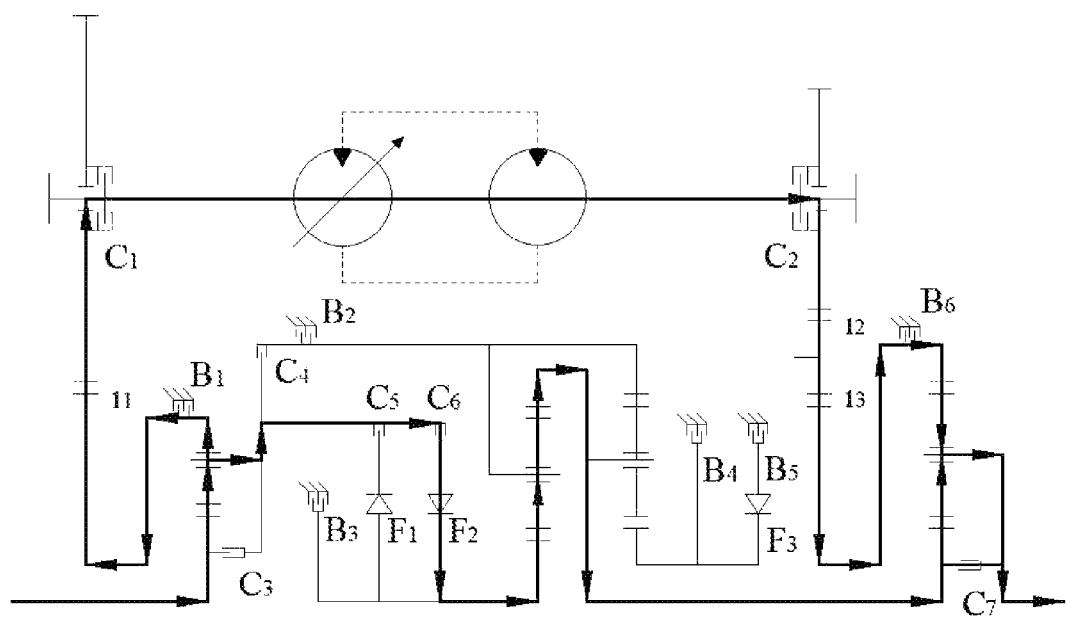
FIG. 8 is a schematic diagram showing the power flow in forward hydro-mechanical hybrid transmission gear-4 in the present invention.

As shown in FIG. 2 and FIG. 8, in forward hydro-mechanical hybrid transmission gear-4, the hydraulic transmission input clutch $C_1$ 31, the hydraulic transmission output clutch $C_2$ 38, and the clutch $C_7$ 55 are engaged, while the brake $B_1$ 25, the brake $B_3$ 411, the brake $B_5$ 413, the brake $B_6$ 51, the clutch $C_3$ 21, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is disengaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is engaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in the same direction as the input shaft 1 within a set displacement ratio range.

The brake $B_2$ 410, the clutch $C_6$ 49, and the one-way clutch $F_2$ 415 are engaged, while the brake $B_4$ 412, the clutch $C_4$ 47, the clutch $C_5$ 48, and the one-way clutch $F_1$ 414 are disengaged. The power in the mechanical transmission assembly 4 sequentially passes through the clutch $C_6$ 49, the one-way clutch $F_2$ 415, the front-set sun gear 41, and the front-set ring gear 43, and is then transmitted to the convergence mechanism 5.

The forward hydro-mechanical hybrid transmission includes four hydro-mechanical transmission split gears, and the rotation speeds of the input shaft 1 and the output shaft 6 are in the following relationship:

$$n_0 = \frac{n_I}{(k_1+1)i_m + \frac{k_1 i_1 i_2 i_3}{e}}$$

if $k_1=2$ and $i_1 i_2 i_3 = 1$, $$\eta_0 = \frac{n_I}{3i_m + \frac{2}{e}},$$

wherein $i_m$ is a transmission ratio of the mechanical transmission assembly, $i_{m1}=2.92$ is a transmission ratio of the mechanical transmission assembly in mechanical gear-1, $i_{m2}=1.57$ is a transmission ratio of the mechanical transmission assembly in mechanical gear-2, $i_{m3}=1.00$ is a transmission ratio of the mechanical transmission assembly in mechanical gear-3, and $i_{m4}=-2.38$ is a transmission ratio of the mechanical transmission assembly in mechanical gear-4.

In hydro-mechanical transmission split gear-1, $i_{m1}=2.92$, and the rotation speeds of the input shaft 1 and the output shaft 6 are in the following relationship:

$$\eta_0 = \frac{n_I}{8.76 + \frac{2}{e}}$$

when $e \in [0,1]$, $n_0 \in [0, 0.093]n_1$.

In hydro-mechanical transmission split gear-2, $i_{m2}=1.57$, and the rotation speeds of the input shaft 1 and the output shaft 6 are in the following relationship:

$$\eta_0 = \frac{n_I}{4.71 + \frac{2}{e}}$$

when $e \in [0,1]$, $n_0 \in [0, 0.149]n_1$.

In hydro-mechanical transmission split gear-3, $i_{m3}=1.00$, and the rotation speeds of the input shaft 1 and the output shaft 6 are in the following relationship:

$$\eta_0 = \frac{n_I}{3.00 + \frac{2}{e}}$$

when $e \in [0,1]$, $n_0 \in [0, 0.200]n_1$.

In hydro-mechanical transmission split gear-4, $i_{m4}=-2.38$, and the rotation speeds of the input shaft 1 and the output shaft 6 are in the following relationship:

$$\eta_0 = \frac{n_I}{-7.14 + \frac{2}{e}}$$

when $e \in [0, 0.25]$, $n_0 \in [0, 1.163]n_1$.

Figure 9:
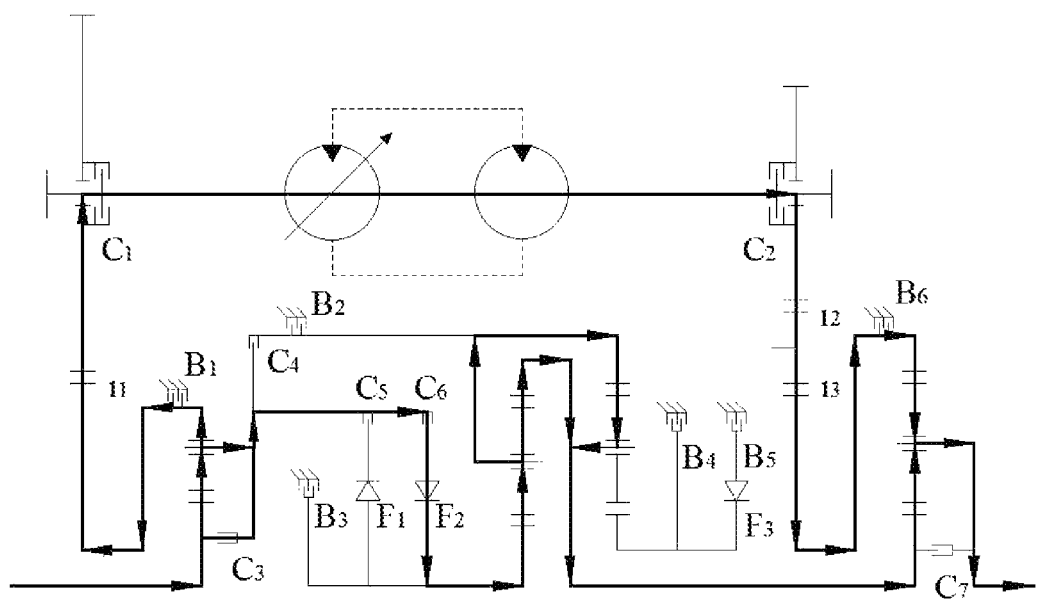
FIG. 9 is a schematic diagram showing the power flow in reverse hydro-mechanical hybrid transmission gear-1 in the present invention.

As shown in FIG. 2 and FIG. 9, in reverse hydromechanical hybrid transmission gear-1, the hydraulic transmission input clutch $C_1$ 31, the hydraulic transmission output clutch $C_2$ 38, and the clutch $C_3$ 21 are engaged, while the brake $B_1$ 25, the brake $B_3$ 411, the brake $B_5$ 413, the brake $B_6$ 51, the clutch $C_7$ 55, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is engaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is disengaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in a direction opposite to the input shaft 1 within a set displacement ratio range.

The brake $B_4$ 412, the clutch $C_6$ 49, and the one-way clutch $F_2$ 415 are engaged, while the brake $B_2$ 410, the clutch $C_4$ 47, the clutch $C_5$ 48, and the one-way clutch $F_1$ 414 are disengaged. The power in the mechanical transmission assembly 4 sequentially passes through the clutch $C_6$ 49, the one-way clutch $F_2$ 415, and the front-set sun gear 41 to the front-set planet carrier 42, and is split at the front-set planet carrier 42 into the front-set ring gear 43 and the rear-set ring gear 46 respectively. The power in the rear-set ring gear 46 passes through the rear-set planet carrier 45 and is converged with the power in the front-set ring gear 43, and the power is then transmitted to the convergence mechanism 5. When the brake $B_4$ 412 is engaged, the rear-set sun gear 44 is locked.

Figure 10:
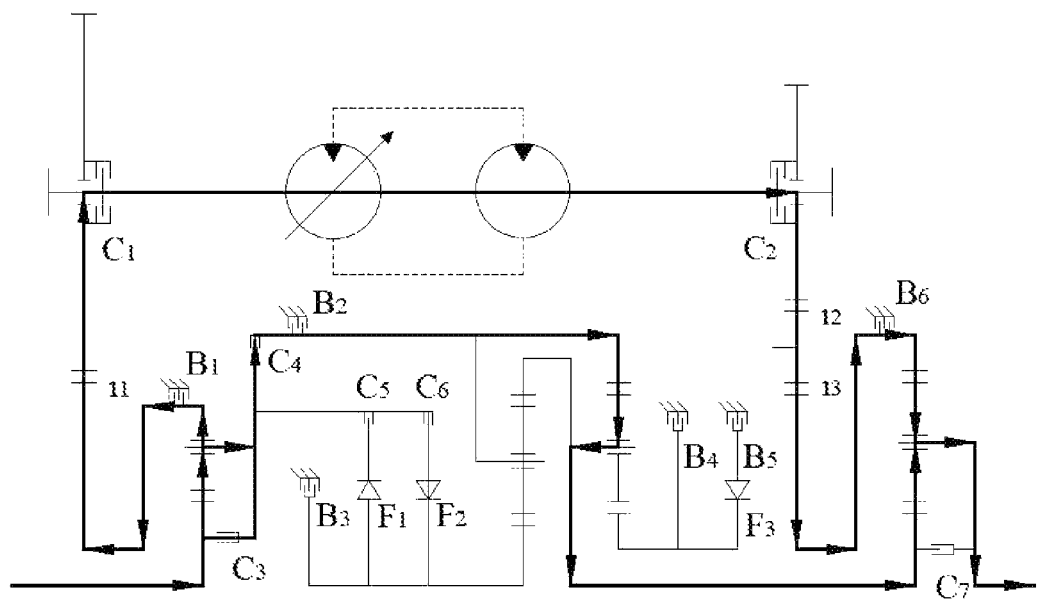
FIG. 10 is a schematic diagram showing the power flow in reverse hydro-mechanical hybrid transmission gear-2 in the present invention.

As shown in FIG. 2 and FIG. 10, in reverse hydromechanical hybrid transmission gear-2, the hydraulic transmission input clutch $C_1$ 31, the hydraulic transmission output clutch $C_2$ 38, and the clutch $C_3$ 21 are engaged, while the brake $B_1$ 25, the brake $B_3$ 411, the brake $B_5$ 413, the brake $B_6$ 51, the clutch $C_7$ 55, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is engaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is disengaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in a direction opposite to the input shaft 1 within a set displacement ratio range.

The brake $B_4$ 412 and the clutch $C_4$ 47 are engaged, while the brake $B_2$ 410, the clutch $C_5$ 48, the clutch $C_6$ 49, the one-way clutch $F_1$ 414, and the one-way clutch $F_2$ 415 are disengaged. The power in the mechanical transmission assembly 4 sequentially passes through the clutch $C_4$ 47, the rear-set ring gear 46, and the rear-set planet carrier 45, and is then transmitted to the convergence mechanism 5.

Figure 11:
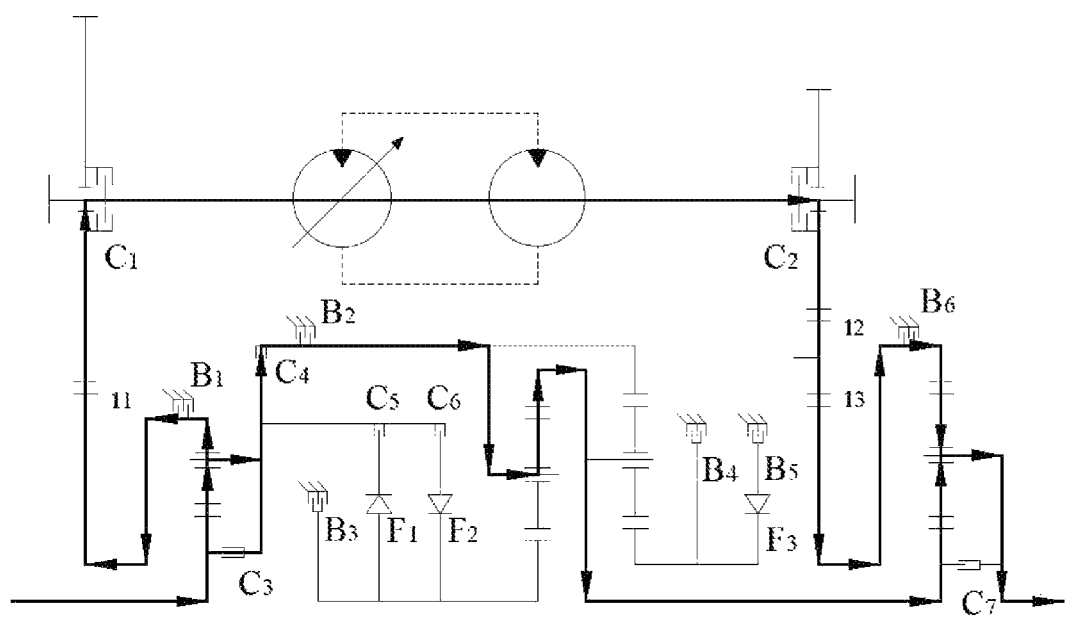
FIG. 11 is a schematic diagram showing the power flow in reverse hydro-mechanical hybrid transmission gear-3 in the present invention.

As shown in FIG. 2 and FIG. 11, in reverse hydromechanical hybrid transmission gear-3, the hydraulic transmission input clutch $C_1$ 31, the hydraulic transmission output clutch $C_2$ 38, and the clutch $C_3$ 21 are engaged, while the brake $B_1$ 25, the brake $B_3$ 411, the brake $B_5$ 413, the brake $B_6$ 51, the clutch $C_7$ 55, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is engaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is disengaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in a direction opposite to the input shaft 1 within a set displacement ratio range.

The clutch $C_4$ 47, the clutch $C_5$ 48, and the one-way clutch $F_1$ 414 are engaged, while the brake $B_2$ 410, the brake $B_4$ 412, the clutch $C_6$ 49, and the one-way clutch $F_2$ 415 are disengaged. The power in the mechanical transmission assembly 4 sequentially passes through the clutch $C_4$ 47, the front-set planet carrier 42, and the front-set ring gear 43, and is then transmitted to the convergence mechanism 5. Since the clutch $C_5$ 48 and the one-way clutch $F_1$ 414 are engaged, the front-set sun gear 41 is prevented from overspeed rotation and rotates at a speed consistent with the front-set planet carrier 42, enabling the entire front planetary gear set mechanism to rotate.

Figure 12:
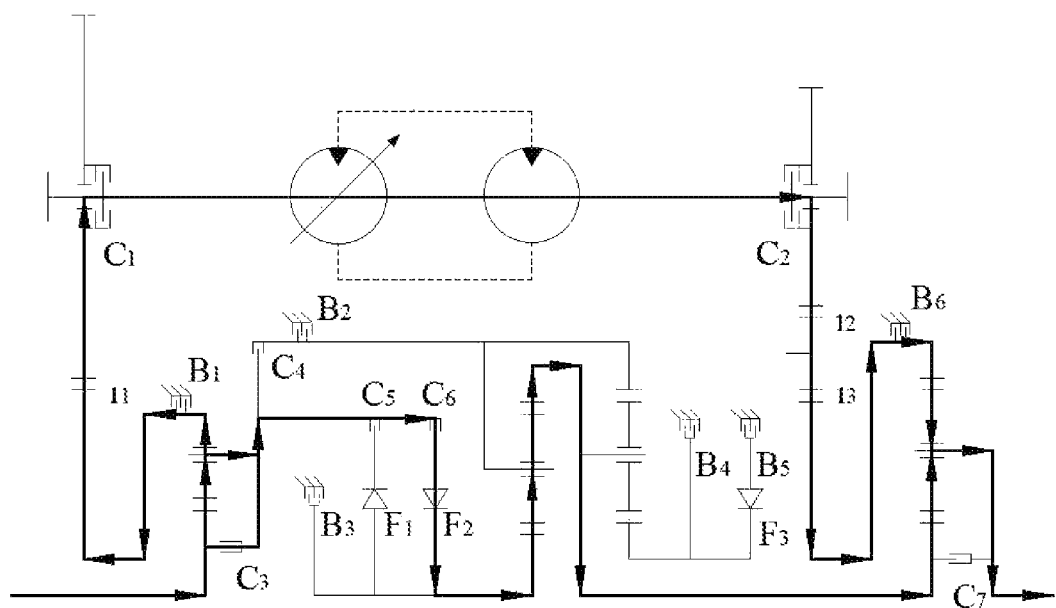
FIG. 12 is a schematic diagram showing the power flow in reverse hydro-mechanical hybrid transmission gear-4 in the present invention.

As shown in FIG. 2 and FIG. 12, in reverse hydromechanical hybrid transmission gear-4, the hydraulic transmission input clutch $C_1$ 31, the hydraulic transmission output clutch $C_2$ 38, and the clutch $C_3$ 21 are engaged, while the brake $B_1$ 25, the brake $B_3$ 411, the brake $B_5$ 413, the brake $B_6$ 51, the clutch $C_7$ 55, and the one-way clutch $F_3$ 416 are disengaged. Power passes through the input shaft 1 to the split mechanism 2, transmitted by the split mechanism 2 to the hydraulic transmission assembly 3 and the mechanical transmission assembly 4 respectively, then converged by the convergence mechanism 5, and output from the output shaft 6. When the clutch $C_3$ 21 is engaged, the split mechanism planet carrier 23 transmits a part of the power from the input shaft 1 to the mechanical transmission assembly 4, and the split mechanism ring gear 24 transmits the other part of the power from the input shaft 1 to the hydraulic transmission assembly 3. When the clutch $C_7$ 55 is disengaged, the power in the mechanical transmission assembly 4 passes through the convergence mechanism sun gear 54 and the convergence mechanism planet carrier 53 and is transmitted to the output shaft 6, the power in the hydraulic transmission assembly 3 passes through the convergence mechanism ring gear 52 and the convergence mechanism planet carrier 53 and is transmitted to the output shaft 6, and the convergence mechanism planet carrier 53 rotates in a direction opposite to the input shaft 1 within a set displacement ratio range.

The brake $B_2$ 410, the clutch $C_6$ 49, and the one-way clutch $F_2$ 415 are engaged, while the brake $B_4$ 412, the clutch $C_4$ 47, the clutch $C_5$ 48, and the one-way clutch $F_1$ 414 are disengaged. The power in the mechanical transmission assembly 4 sequentially passes through the clutch $C_6$ 49, the one-way clutch $F_2$ 415, the front-set sun gear 41, and the front-set ring gear 43, and is then transmitted to the convergence mechanism 5.

The reverse hydro-mechanical hybrid transmission includes four hydro-mechanical transmission convergence gears, and the rotation speeds of the input shaft 1 and the output shaft 6 are in the following relationship:

$$n_0 = \frac{\frac{1}{i_m} - k_2 \frac{e}{i_1 i_2 i_3}}{k_2 + 1} n_I$$

wherein $k_2$ is a convergence mechanism characteristic parameter,
if $k_2=2$ and $i_1 i_2 i_3=1$, $$n_0 = \frac{\frac{1}{i_m} - 2e}{3} n_I.$$

In hydro-mechanical transmission convergence gear-1, $i_{m1}=2.92$, and the rotation speeds of the input shaft 1 and the output shaft 6 are in the following relationship:

$$n_0 = \frac{0.342 - 2e}{3} n_I$$

when $e \in [0.171, 1]$, $n_0 \in [-0.553, 0] n_1$.

In hydro-mechanical transmission convergence gear-2, $i_{m2}=1.57$, and the rotation speeds of the input shaft 1 and the output shaft 6 are in the following relationship:

$$n_0 = \frac{0.637 - 2e}{3} n_I$$

when $e \in [0.3185, 1]$, $n_0 \in [-0.454, 0] n_1$.

In hydro-mechanical transmission convergence gear-3, $i_{m3}=1.00$, and the rotation speeds of the input shaft 1 and the output shaft 6 are in the following relationship:

$$n_0 = \frac{1 - 2e}{3} n_I$$

when $e \in [0.5, 1]$, $n_0 \in [-0.333, 0] n_1$.

In hydro-mechanical transmission convergence gear-4, $i_{m4}=-2.38$, and the rotation speeds of the input shaft 1 and the output shaft 6 are in the following relationship:

$$n_0 = \frac{-0.420 - 2e}{3} n_I$$

when $e \in [0, 1]$, $n_0 \in [-0.807, -0.140] n_1$.

Figure 13:
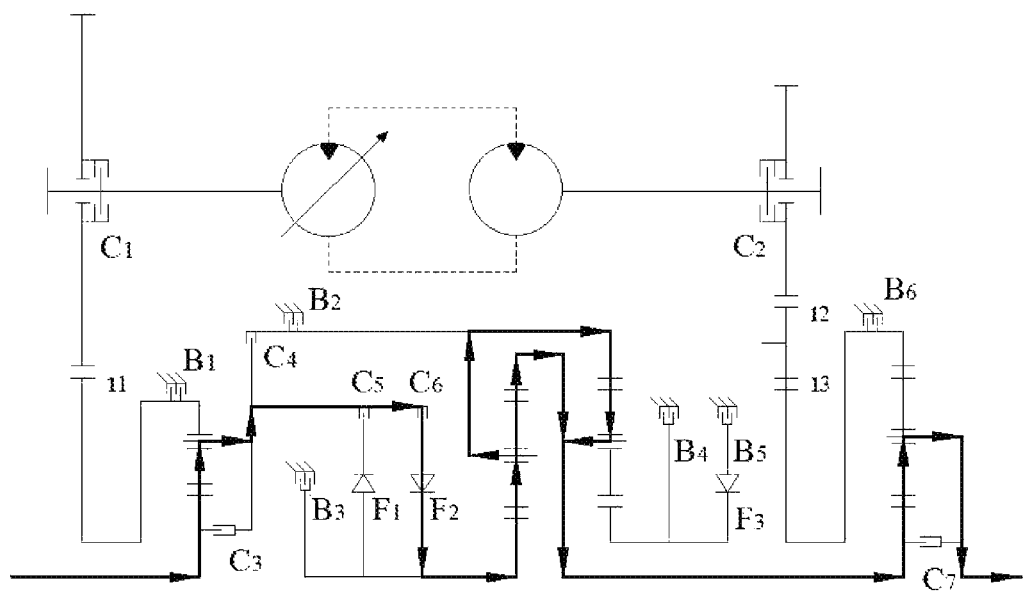
FIG. 13 is a schematic diagram showing the power flow in forward mechanical gear-1 in the present invention.

As shown in FIG. 2 and FIG. 13, in forward pure mechanical transmission gear-1, the brake $B_1$ 25 and the brake $B_6$ 51 are engaged, while the brake $B_2$ 410, the brake $B_4$ 412, the hydraulic transmission input clutch $C_1$ 31, the hydraulic transmission output clutch $C_2$ 38, the clutch $C_3$ 21, and the clutch $C_7$ 55 are disengaged. Power passes through the input shaft 1, the split mechanism 2, the mechanical transmission assembly 4, and the convergence mechanism 5 and is output from the output shaft 6. When the brake $B_1$ 25 is engaged, the split mechanism ring gear 24 is locked, and the entire split mechanism 2 rotates. When the brake $B_6$ 51 is engaged, the convergence mechanism ring gear 52 is locked, and power passes through the convergence mechanism sun gear 54 and the convergence mechanism planet carrier 53 to the output shaft 6.

The brake $B_5$ 413, the one-way clutch $F_3$ 416, the clutch $C_6$ 49, and the one-way clutch $F_2$ 415 are engaged, while the brake $B_3$ 411, the clutch $C_4$ 47, the clutch $C_5$ 48, and the one-way clutch $F_1$ 414 are disengaged. Power sequentially passes through the clutch $C_6$ 49, the one-way clutch $F_2$ 415, and the front-set sun gear 41 to the front-set planet carrier 42, and is split at the front-set planet carrier 42 into the front-set ring gear 43 and the rear-set ring gear 46 respectively. The power in the rear-set ring gear 46 passes through the rear-set planet carrier 45 and is converged with the power in the front-set ring gear 43, and the power is then transmitted to the convergence mechanism 5. When the brake $B_5$ 413 and the one-way clutch $F_3$ 416 are engaged, the rear-set sun gear 44 is locked.

Figure 14:
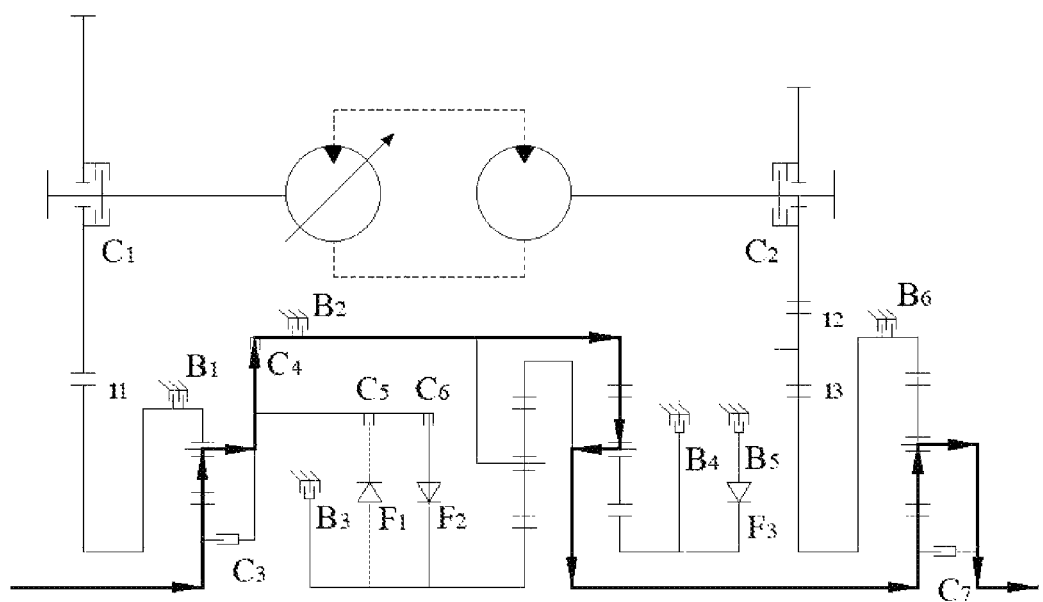
FIG. 14 is a schematic diagram showing the power flow in forward mechanical gear-2 in the present invention.

As shown in FIG. 2 and FIG. 14, in forward pure mechanical transmission gear-2, the brake $B_1$ 25 and the brake $B_6$ 51 are engaged, while the brake $B_2$ 410, the brake $B_4$ 412, the hydraulic transmission input clutch $C_1$ 31, the hydraulic transmission output clutch $C_2$ 38, the clutch $C_3$ 21, and the clutch $C_7$ 55 are disengaged. Power passes through the input shaft 1, the split mechanism 2, the mechanical transmission assembly 4, and the convergence mechanism 5 and is output from the output shaft 6. When the brake $B_1$ 25 is engaged, the split mechanism ring gear 24 is locked, and the entire split mechanism 2 rotates. When the brake $B_6$ 51 is engaged, the convergence mechanism ring gear 52 is locked, and power passes through the convergence mechanism sun gear 54 and the convergence mechanism planet carrier 53 to the output shaft 6.

The brake $B_5$ 413, the one-way clutch $F_3$ 416, and the clutch $C_4$ 47 are engaged, while the brake $B_3$ 411, the clutch $C_5$ 48, the clutch $C_6$ 49, the one-way clutch $F_1$ 414, and the one-way clutch $F_2$ 415 are disengaged. Power sequentially passes through the clutch $C_4$ 47, the rear-set ring gear 46, and the rear-set planet carrier 45, and is then transmitted to the convergence mechanism 5. When the brake $B_5$ 413 and the one-way clutch $F_3$ 416 are engaged, the rear-set sun gear 44 is locked.

Figure 15:
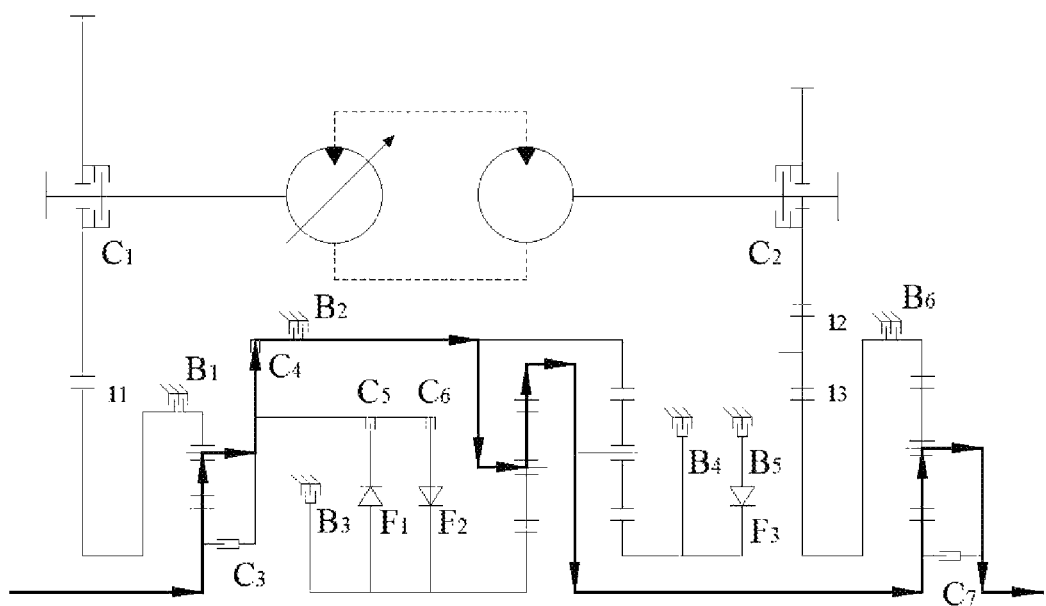
FIG. 15 is a schematic diagram showing the power flow in forward mechanical gear-3 in the present invention.

As shown in FIG. 2 and FIG. 15, in forward pure mechanical transmission gear-3, the brake $B_1$ 25 and the brake $B_6$ 51 are engaged, while the brake $B_2$ 410, the brake $B_4$ 412, the hydraulic transmission input clutch $C_1$ 31, the hydraulic transmission output clutch $C_2$ 38, the clutch $C_3$ 21, and the clutch $C_7$ 55 are disengaged. Power passes through the input shaft 1, the split mechanism 2, the mechanical transmission assembly 4, and the convergence mechanism 5 and is output from the output shaft 6. When the brake $B_1$ 25 is engaged, the split mechanism ring gear 24 is locked, and the entire split mechanism 2 rotates. When the brake $B_6$ 51 is engaged, the convergence mechanism ring gear 52 is locked, and power passes through the convergence mechanism sun gear 54 and the convergence mechanism planet carrier 53 to the output shaft 6.

The brake $B_5$ 413, the clutch $C_4$ 47, the clutch $C_5$ 48, the one-way clutch $F_1$ 414, and the one-way clutch $F_3$ 416 are engaged, while the brake $B_3$ 411, the clutch $C_6$ 49, and the one-way clutch $F_2$ 415 are disengaged. Power sequentially passes through the clutch $C_4$ 47, the front-set planet carrier 42, and the front-set ring gear 43, and is then transmitted to the convergence mechanism 5. Since the clutch $C_5$ 48 and the one-way clutch $F_1$ 414 are engaged, the front-set sun gear 41 is prevented from overspeed rotation and rotates at a speed consistent with the front-set planet carrier 42, enabling the entire front planetary gear set mechanism to rotate.

Figure 16:
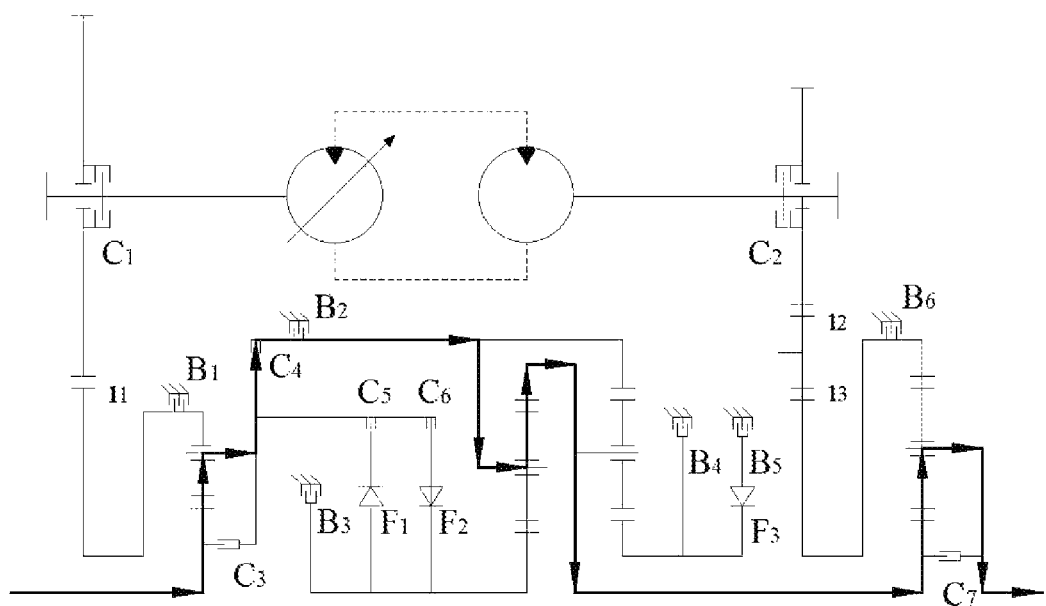
FIG. 16 is a schematic diagram showing the power flow in forward mechanical gear-4 in the present invention.

As shown in FIG. 2 and FIG. 16, in forward pure mechanical transmission gear-4, the brake $B_1$ 25 and the brake $B_6$ 51 are engaged, while the brake $B_2$ 410, the brake $B_4$ 412, the hydraulic transmission input clutch $C_1$ 31, the hydraulic transmission output clutch $C_2$ 38, the clutch $C_3$ 21, and the clutch $C_7$ 55 are disengaged. Power passes through the input shaft 1, the split mechanism 2, the mechanical transmission assembly 4, and the convergence mechanism 5 and is output from the output shaft 6. When the brake $B_1$ 25 is engaged, the split mechanism ring gear 24 is locked, and the entire split mechanism 2 rotates. When the brake $B_6$ 51 is engaged, the convergence mechanism ring gear 52 is locked, and power passes through the convergence mechanism sun gear 54 and the convergence mechanism planet carrier 53 to the output shaft 6.

The brake $B_3$ 411 and the clutch $C_4$ 47 are engaged, while the brake $B_5$ 413, the clutch $C_5$ 48, the clutch $C_6$ 49, the one-way clutch $F_1$ 414, the one-way clutch $F_2$ 415, and the one-way clutch $F_3$ 416 are disengaged. Power sequentially passes through the clutch $C_4$ 47, the front-set planet carrier 42, and the front-set ring gear 43, and is then transmitted to the convergence mechanism 5.

Figure 17:
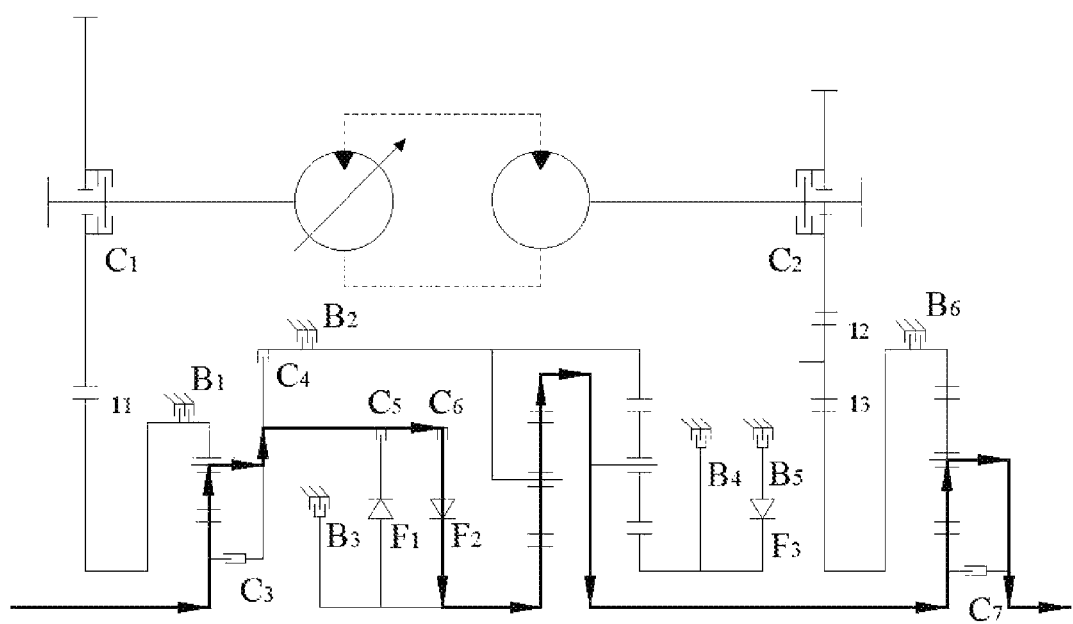
FIG. 17 is a schematic diagram showing the power flow in a reverse pure mechanical transmission gear in the present invention.
Figure 19:
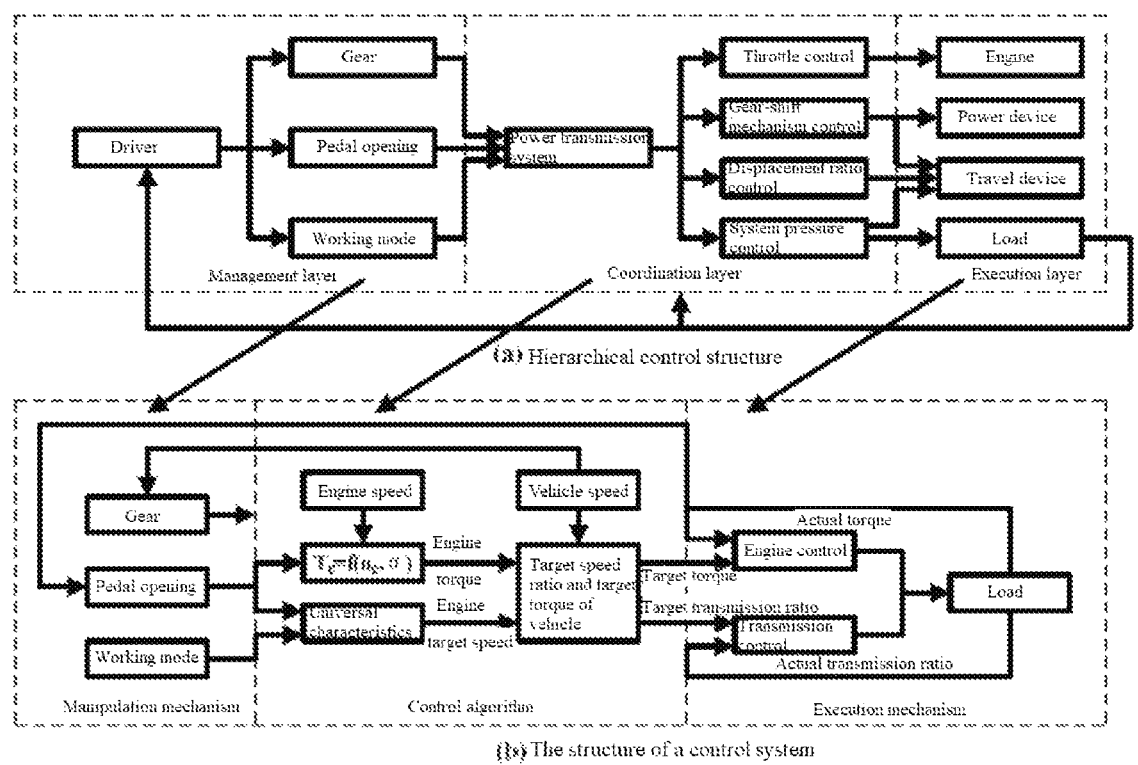
FIG. 19 is a diagram showing the principle of dynamic coordinated control of a hybrid transmission system in a man-machine interaction environment.

As shown in FIG. 2 and FIG. 17, in reverse pure mechanical transmission, the brake $B_1$ 25, the brake $B_2$ 410, the brake $B_6$ 51, the clutch $C_6$ 49, and the one-way clutch $F_2$ 415 are engaged, while the other brakes and clutches are disengaged. When the brake $B_1$ 25 is engaged, the split mechanism ring gear 24 is locked, and power passes through the split mechanism sun gear 22 and the split mechanism planet carrier 23 and is transmitted to the mechanical transmission assembly 4. When the clutch $C_6$ 49 and the one-way clutch $F_2$ 415 are engaged, the power in the mechanical transmission assembly 4 sequentially passes through the clutch $C_6$ 49, the one-way clutch $F_2$ 415, the front-set sun gear 41, and the front-set ring gear 43, and is then transmitted to the convergence mechanism sun gear 54. When the brake $B_6$ 51 is engaged, the convergence mechanism ring gear 52 is locked, and power passes through the convergence mechanism sun gear 54 and the convergence mechanism planet carrier 53 to the output shaft 6.

In pure mechanical transmission, the rotation speeds of the input shaft 1 and the output shaft 6 are in the following relationship:

in mechanical gear-1, $n_0=0.342n_1$;
in mechanical gear-2, $n_0=0.637n_1$;
in mechanical gear-3, $n_0=n_1$;
in mechanical gear-4, $n_0=1.429n_1$;
in mechanical reverse gear, $n_0=-0.420n_1$.

Through model predictive control of the transmission system, the problem of globally optimal dynamic programming of fuel economy is transformed into the local optimization control problem in a prediction region, and the future vehicle operation status in the prediction region is continuously updated through rolling optimization, to obtain optimization results and realize real-time application of predictive control in the hydro-mechanical hybrid transmission system. Vehicle predictive control based on time domain is online rolling optimization control within the framework of model predictive control and implemented in combination with dynamic programming, and the principle thereof is shown in FIG. 18(a).

In a prediction region q, the state transition equation of vehicle predictive control in hybrid transmission is:

$$x(k+1)=\mu[x(k),u(k)]$$

wherein $\mu$ is a time-discrete system function, x(k+1) is a state variable related to k+1, x(k) is a state variable related to k, and u(k) is a control variable related to k.

In the prediction region q, an objective function of minimizing the fuel consumption of the hybrid transmission system is:

$$J_1 = \min \sum_{t=t(k)}^{t=t(k+q)} v_k(x_k, u_k)\Delta t$$

wherein $J_1$ is an objective function of fuel economy when a linear predictive control system is adopted, $v_k$ is a stage indicator of the $k^{th}$ stage, $x_k$ is a state variable of the $k^{th}$ stage, $u_k$ is a control variable of the $k^{th}$ stage, $\Delta t$ is a time interval, t(k) is a time point of the $k^{th}$ stage, and t(k+q) is a time point of the $(k+q)^{th}$ stage.

In a control region p, a sensing device is generally adopted for measurement; and in the prediction region q, a GPS/GIS system is generally adopted for prediction. Prediction relies on the selection of an appropriate prediction window length for data collection as well as a high cost-performance ratio of the predictive control system.

The structures of the predictive control systems are shown in FIG. 18(b). The vehicle dynamics model of the hybrid transmission system is of a typical nonlinear system, and needs to satisfy various constraints. The linear predictive control system can hardly describe the practical dynamics model of a vehicle system. Therefore, the nonlinear predictive control system is adopted to control dynamic characteristics and state variables of the hybrid transmission system, constrain control variables, estimate future states, and solve the online optimal control problem of a bounded region.

In this case, the objective function of minimizing the fuel consumption of the hybrid transmission system is:

$$J_2 = \min \sum_{t=t(k)}^{t=t(k+q)} L[x(t), u(t)]$$

wherein $J_2$ is an objective function of fuel economy when a nonlinear predictive control system is adopted, L is an instantaneous fuel consumption function at a time point t, x(t) is a state variable at a time point t, and u(t) is a control variable at a time point t.

What is claimed is:

1. A hydro-mechanical hybrid transmission device, comprising an input shaft, a split mechanism, a hydraulic transmission assembly, a mechanical transmission assembly, a convergence mechanism, and an output shaft, wherein
the input shaft is connected, through the split mechanism, to the hydraulic transmission assembly and the mechanical transmission assembly wherein the hydraulic transmission assembly and the mechanical transmission assembly are connected in parallel, and the hydraulic transmission assembly and the mechanical transmission assembly are each connected to the output shaft through the convergence mechanism;
the split mechanism comprises a clutch $C_3$, a split mechanism sun gear, a split mechanism planet carrier, a split mechanism ring gear, and a brake $B_1$, wherein
the clutch $C_3$ is connected to the split mechanism sun gear and the split mechanism planet carrier,
the brake $B_1$ is connected to the split mechanism ring gear,
the input shaft is connected to the split mechanism sun gear,
the split mechanism is connected to the hydraulic transmission assembly through the split mechanism ring gear, and
the split mechanism is connected to the mechanical transmission assembly through the split mechanism sun gear and the split mechanism planet carrier;
the convergence mechanism comprises a brake $B_6$, a convergence mechanism ring gear, a convergence mechanism planet carrier, a convergence mechanism sun gear, and a clutch $C_7$, wherein
the brake $B_6$ is connected to the convergence mechanism ring gear,
the clutch $C_7$ is connected to the convergence mechanism planet carrier and the convergence mechanism sun gear,
the convergence mechanism is connected to the hydraulic transmission assembly through the convergence mechanism ring gear,
the convergence mechanism is connected to the mechanical transmission assembly through the convergence mechanism sun gear, and
the convergence mechanism is connected to the output shaft through the convergence mechanism planet carrier and the convergence mechanism sun gear;
the hydraulic transmission assembly comprises a hydraulic transmission input clutch $C_1$, a hydraulic transmission input gear pair, a unidirectional variable pump, a hydraulic pipe, a unidirectional quantitative motor, a reverse gear pair, a hydraulic transmission output gear pair, and a hydraulic transmission output clutch $C_2$, wherein
the unidirectional variable pump is connected to the split mechanism through the hydraulic transmission input gear pair,
the hydraulic transmission input clutch $C_1$ is arranged between the hydraulic transmission input gear pair and the unidirectional variable pump,
the unidirectional variable pump is connected to the unidirectional quantitative motor through the hydraulic pipe,
the unidirectional quantitative motor is connected to the convergence mechanism sequentially through the hydraulic transmission output gear pair and the reverse gear pair, and
the hydraulic transmission output clutch $C_2$ is arranged between the unidirectional quantitative motor and the hydraulic transmission output gear pair.

2. The hydro-mechanical hybrid transmission device according to claim 1, wherein the mechanical transmission assembly comprises a front-set sun gear, a front-set planet carrier, a front-set ring gear, a rear-set sun gear, a rear-set planet carrier, a rear-set ring gear, a clutch $C_4$, a clutch $C_5$, a clutch $C_6$, a brake $B_2$, a brake $B_3$, a brake $B_4$, a brake $B_5$, a one-way clutch $F_1$, a one-way clutch $F_2$, and a one-way clutch $F_3$; wherein
the front-set sun gear is connected to the split mechanism through the clutch $C_5$ and the clutch $C_6$, wherein the clutch $C_5$ and the clutch $C_6$ are connected in parallel, the one-way clutch $F_1$ is arranged between the clutch $C_5$ and the front-set sun gear, and the one-way clutch $F_2$ is arranged between the clutch $C_6$ and the front-set sun gear, the one-way clutch $F_1$ and the one-way clutch $F_2$ have opposite power conduction directions, and the front-set sun gear is also connected to the brake $B_3$;
the front-set planet carrier is connected to the split mechanism through the clutch $C_4$, the brake $B_2$ is arranged between the front-set planet carrier and the clutch $C_4$, and the front-set planet carrier is fixedly connected to the rear-set ring gear;
the front-set ring gear is connected to the rear-set planet carrier and the convergence mechanism;
the rear-set sun gear is connected to the brake $B_4$ and the brake $B_5$, wherein the brake $B_4$ and the brake $B_5$ are connected in parallel, the one-way clutch $F_3$ is arranged between the rear-set sun gear and the brake $B_5$, and a brake direction of the one-way clutch $F_3$ is a rotation direction of the rear-set sun gear and the rotation direction of the rear-set sun gear is opposite to a rotation direction of the split mechanism planet carrier;
the rear-set planet carrier is connected to the front-set ring gear and the convergence mechanism;
the rear-set ring gear is connected to the front-set planet carrier and the split mechanism, and the brake $B_2$ and the clutch $C_4$ in parallel connection are arranged between the rear-set ring gear and the split mechanism.

3. A control method of the hydro-mechanical hybrid transmission device according to claim 2, wherein three types of transmission in a forward direction, comprising a forward pure hydraulic transmission, a forward hydro-mechanical hybrid transmission, and a forward pure mechanical transmission, and three types of transmission in a reverse direction, comprising a reverse pure hydraulic transmission, a reverse hydro-mechanical hybrid transmission, and a reverse pure mechanical transmission, are implemented through a combination and an engagement/disengagement of the brakes and the clutches; wherein
in the forward pure hydraulic transmission, the brake $B_2$, the hydraulic transmission input clutch $C_1$, the hydraulic transmission output clutch $C_2$, the clutch $C_4$, and the clutch $C_7$ are engaged, while other brakes and clutches are disengaged; when the brake $B_2$ and the clutch $C_4$ are engaged, the split mechanism planet carrier is locked, the split mechanism sun gear and the split mechanism ring gear rotate in opposite directions, and power passes through the input shaft, the split mechanism, the hydraulic transmission assembly, and the convergence mechanism and the power is output from the output shaft; when the clutch $C_7$ is engaged, the convergence mechanism planet carrier and the convergence mechanism sun gear of the convergence mechanism are interlocked, an entire convergence mechanism rotates, and by an action of the reverse gear pair, the input shaft and the output shaft rotate in a same direction;

in the forward pure mechanical transmission, the brake $B_1$ and the brake $B_6$ are engaged, while the brake $B_2$, the brake $B_4$, the hydraulic transmission input clutch $C_1$, the hydraulic transmission output clutch $C_2$, the clutch $C_3$, and the clutch $C_7$ are disengaged; the power passes through the input shaft, the split mechanism, the mechanical transmission assembly, and the convergence mechanism and the power is output from the output shaft; when the brake $B_1$ is engaged, the split mechanism ring gear is locked, and the split mechanism sun gear and the split mechanism planet carrier transmit the power as gear transmission mechanisms; when the brake $B_6$ is engaged, the convergence mechanism ring gear is locked, and power passes through the convergence mechanism sun gear and the convergence mechanism planet carrier to the output shaft;

in the forward hydro-mechanical hybrid transmission, the hydraulic transmission input clutch $C_1$, the hydraulic transmission output clutch $C_2$, and the clutch $C_7$ are engaged, while the brake $B_1$, the brake $B_3$, the brake $B_5$, the brake $B_6$, the clutch $C_3$, and the one-way clutch $F_3$ are disengaged; the power passes through the input shaft to the split mechanism, transmitted by the split mechanism to the hydraulic transmission assembly and the mechanical transmission assembly respectively, then converged by the convergence mechanism, and output from the output shaft; when the clutch $C_3$ is disengaged, the split mechanism planet carrier transmits a first part of the power from the input shaft to the mechanical transmission assembly, and the split mechanism ring gear transmits a second part of the power from the input shaft to the hydraulic transmission assembly; when the clutch $C_7$ is engaged, the power in the mechanical transmission assembly passes through the convergence mechanism sun gear and the convergence mechanism planet carrier and is transmitted to the output shaft, and the power in the hydraulic transmission assembly passes through the convergence mechanism ring gear and the convergence mechanism planet carrier and is transmitted to the output shaft, and the convergence mechanism planet carrier rotates in the same direction as the input shaft within a set displacement ratio range;

in the reverse pure hydraulic transmission, the hydraulic transmission input clutch $C_1$, the hydraulic transmission output clutch $C_2$, the clutch $C_3$, and the clutch $C_7$ are engaged, while the other brakes and clutches are disengaged; when the clutch $C_3$ is engaged, the split mechanism sun gear and the split mechanism planet carrier are interlocked, an entire split mechanism rotates, and the power passes through the input shaft, the split mechanism, the hydraulic transmission assembly, and the convergence mechanism and the power is output from the output shaft; when the clutch $C_7$ is engaged, the convergence mechanism planet carrier and the convergence mechanism sun gear of the convergence mechanism are interlocked, the entire convergence mechanism rotates, and the input shaft and the output shaft rotate in the opposite directions;

in the reverse pure mechanical transmission, the brake $B_1$, the brake $B_2$, the brake $B_6$, the clutch $C_6$, and the one-way clutch $F_2$ are engaged, while the other brakes and clutches are disengaged; when the brake $B_1$ is engaged, the split mechanism ring gear is locked, and the power passes through the split mechanism sun gear and the split mechanism planet carrier and the power is transmitted to the mechanical transmission assembly; when the clutch $C_6$ and the one-way clutch $F_2$ are engaged, the power in the mechanical transmission assembly sequentially passes through the clutch $C_6$, the one-way clutch $F_2$, the front-set sun gear, and the front-set ring gear, and is then transmitted to the convergence mechanism sun gear; when the brake $B_6$ is engaged, the convergence mechanism ring gear is locked, and the power passes through the convergence mechanism sun gear and the convergence mechanism planet carrier to the output shaft;

in the reverse hydro-mechanical hybrid transmission, the hydraulic transmission input clutch $C_1$, the hydraulic transmission output clutch $C_2$, and the clutch $C_3$ are engaged, while the brake $B_1$, the brake $B_3$, the brake $B_5$, the brake $B_6$, the clutch $C_7$, and the one-way clutch $F_3$ are disengaged; the power passes through the input shaft to the split mechanism, transmitted by the split mechanism to the hydraulic transmission assembly and the mechanical transmission assembly respectively, then converged by the convergence mechanism, and output from the output shaft; when the clutch $C_3$ is engaged, the split mechanism planet carrier transmits the first part of the power from the input shaft to the mechanical transmission assembly, and the split mechanism ring gear transmits the second part of the power from the input shaft to the hydraulic transmission assembly; when the clutch $C_7$ is disengaged, the power in the mechanical transmission assembly passes through the convergence mechanism sun gear and the convergence mechanism planet carrier and is transmitted to the output shaft, the power in the hydraulic transmission assembly passes through the convergence mechanism ring gear and the convergence mechanism planet carrier and is transmitted to the output shaft, and the convergence mechanism planet carrier rotates in a direction opposite to the input shaft within the set displacement ratio range.

4. The control method of the hydro-mechanical hybrid transmission device according to claim 3, wherein the forward pure mechanical transmission comprises a first mechanical gear, a second mechanical gear, a third mechanical gear, and a fourth mechanical gear, specifically implemented as follows:

in the first mechanical gear, the brake $B_5$, the one-way clutch $F_3$, the clutch $C_6$, and the one-way clutch $F_2$ are engaged, while the brake $B_3$, the clutch $C_4$, the clutch $C_5$, and the one-way clutch $F_1$ are disengaged; the power sequentially passes through the clutch $C_6$, the one-way clutch $F_2$, and the front-set sun gear to the front-set planet carrier, and the power is split at the front-set planet carrier into the front-set ring gear and the rear-set ring gear respectively; the power in the rear-set ring gear passes through the rear-set planet carrier and the power is converged with the power in the front-set ring gear, and the power is then transmitted to the convergence mechanism; when the brake $B_5$ and the one-way clutch $F_3$ are engaged, the rear-set sun gear is locked;

in the second mechanical gear, the brake $B_5$, the one-way clutch $F_3$, and the clutch $C_4$ are engaged, while the brake $B_3$, the clutch $C_5$, the clutch $C_6$, the one-way clutch $F_1$, and the one-way clutch $F_2$ are disengaged; the power sequentially passes through the clutch $C_4$, the rear-set ring gear, and the rear-set planet carrier, and the power is then transmitted to the convergence mechanism; when the brake $B_5$ and the one-way clutch $F_3$ are engaged, the rear-set sun gear is locked;

in the third mechanical gear, the brake $B_5$, the clutch $C_4$, the clutch $C_5$, the one-way clutch $F_1$, and the one-way clutch $F_3$ are engaged, while the brake $B_3$, the clutch $C_6$, and the one-way clutch $F_2$ are disengaged; the power sequentially passes through the clutch $C_4$, the front-set planet carrier, and the front-set ring gear, and the power is then transmitted to the convergence mechanism; since the clutch $C_5$ and the one-way clutch $F_1$ are engaged, the front-set sun gear is prevented from an overspeed rotation and the front-set sun gear rotates at a speed consistent with the front-set planet carrier, enabling an entire front planetary gear set mechanism to rotate;

in the fourth mechanical gear, the brake $B_3$ and the clutch $C_4$ are engaged, while the brake $B_5$, the clutch $C_5$, the clutch $C_6$, the one-way clutch $F_1$, the one-way clutch $F_2$, and the one-way clutch $F_3$ are disengaged; the power sequentially passes through the clutch $C_4$, the front-set planet carrier, and the front-set ring gear, and the power is then transmitted to the convergence mechanism.

5. The control method of the hydro-mechanical hybrid transmission device according to claim 3, wherein the forward hydro-mechanical hybrid transmission comprises a first forward hybrid transmission gear, a second forward hybrid transmission gear, a third forward hybrid transmission gear, and a fourth forward hybrid transmission gear, specifically implemented as follows:

in the first forward hybrid gear, the brake $B_4$, the clutch $C_6$, and the one-way clutch $F_2$ are engaged, while the brake $B_2$, the clutch $C_4$, the clutch $C_5$, and the one-way clutch $F_1$ are disengaged; the power in the mechanical transmission assembly sequentially passes through the clutch $C_6$, the one-way clutch $F_2$, and the front-set sun gear to the front-set planet carrier, and the power is split at the front-set planet carrier into the front-set ring gear and the rear-set ring gear respectively; the power in the rear-set ring gear passes through the rear-set planet carrier and the power is converged with the power in the front-set ring gear, and the power is then transmitted to the convergence mechanism; when the brake $B_4$ is engaged, the rear-set sun gear is locked;

in the second forward hybrid gear, the brake $B_4$ and the clutch $C_4$ are engaged, while the brake $B_2$, the clutch $C_5$, the clutch $C_6$, the one-way clutch $F_1$, and the one-way clutch $F_2$ are disengaged; the power in the mechanical transmission assembly sequentially passes through the clutch $C_4$, the rear-set ring gear, and the rear-set planet carrier, and the power is then transmitted to the convergence mechanism;

in the third forward hybrid gear, the clutch $C_4$, the clutch $C_5$, and the one-way clutch $F_1$ are engaged, while the brake $B_2$, the brake $B_4$, the clutch $C_6$, and the one-way clutch $F_2$ are disengaged; the power in the mechanical transmission assembly sequentially passes through the clutch $C_4$, the front-set planet carrier, and the front-set ring gear, and the power is then transmitted to the convergence mechanism; since the clutch $C_5$ and the one-way clutch $F_1$ are engaged, the front-set sun gear is prevented from an overspeed rotation and rotates at a speed consistent with the front-set planet carrier, enabling an entire front planetary gear set mechanism to rotate;

in the fourth forward hybrid gear, the brake $B_2$, the clutch $C_6$, and the one-way clutch $F_2$ are engaged, while the brake $B_4$, the clutch $C_4$, the clutch $C_5$, and the one-way clutch $F_1$ are disengaged; the power in the mechanical transmission assembly sequentially passes through the clutch $C_6$, the one-way clutch $F_2$, the front-set sun gear, and the front-set ring gear, and the power is then transmitted to the convergence mechanism.

6. The control method of the hydro-mechanical hybrid transmission device according to claim 3, wherein the reverse hydro-mechanical hybrid transmission comprises a first reverse hybrid transmission gear, a second reverse hybrid transmission gear, a third reverse hybrid transmission gear, and a fourth reverse hybrid transmission gear, specifically implemented as follows:

in the first reverse hybrid gear, the brake $B_4$, the clutch $C_6$, and the one-way clutch $F_2$ are engaged, while the brake $B_2$, the clutch $C_4$, the clutch $C_5$, and the one-way clutch $F_1$ are disengaged; the power in the mechanical transmission assembly sequentially passes through the clutch $C_6$, the one-way clutch $F_2$, and the front-set sun gear to the front-set planet carrier, and the power is split at the front-set planet carrier into the front-set ring gear and the rear-set ring gear respectively; the power in the rear-set ring gear passes through the rear-set planet carrier and the power is converged with the power in the front-set ring gear, and the power is then transmitted to the convergence mechanism; when the brake $B_4$ is engaged, the rear-set sun gear is locked;

in the second reverse hybrid gear, the brake $B_4$ and the clutch $C_4$ are engaged, while the brake $B_2$, the clutch $C_5$, the clutch $C_6$, the one-way clutch $F_1$, and the one-way clutch $F_2$ are disengaged; the power in the mechanical transmission assembly sequentially passes through the clutch $C_4$, the rear-set ring gear, and the rear-set planet carrier, and the power is then transmitted to the convergence mechanism;

in the third reverse hybrid gear, the clutch $C_4$, the clutch $C_5$, and the one-way clutch $F_1$ are engaged, while the brake $B_2$, the brake $B_4$, the clutch $C_6$, and the one-way clutch $F_2$ are disengaged; the power in the mechanical transmission assembly sequentially passes through the clutch $C_4$, the front-set planet carrier, and the front-set ring gear, and the power is then transmitted to the convergence mechanism; since the clutch $C_5$ and the one-way clutch $F_1$ are engaged, the front-set sun gear is prevented from an overspeed rotation and rotates at a speed consistent with the front-set planet carrier, enabling an entire front planetary gear set mechanism to rotate;

in the fourth reverse hybrid gear, the brake $B_2$, the clutch $C_6$, and the one-way clutch $F_2$ are engaged, while the brake $B_4$, the clutch $C_4$, the clutch $C_5$, and the one-way clutch $F_1$ are disengaged; the power in the mechanical transmission assembly sequentially passes through the clutch $C_6$, the one-way clutch $F_2$, the front-set sun gear, and the front-set ring gear, and the power is then transmitted to the convergence mechanism.

7. The control method of the hydro-mechanical hybrid transmission device according to claim 5, wherein an online rolling optimization control is implemented by adopting a vehicle predictive control based on a time domain in combination with a dynamic programming;

in a prediction region q, a state transition equation of the vehicle predictive control in a hybrid transmission is:

$$x(k+1)=\mu[x(k),u(k)];$$

wherein μ is a time-discrete system function, x(k+1) is a state variable related to k+1, x(k) is a state variable related to k, and u(k) is a control variable related to k;

in the prediction region q, an objective function of minimizing a fuel consumption of a hydro-mechanical hybrid transmission system is:

$$J_1 = \min \sum_{t=t(k)}^{t=t(k+q)} v_k(x_k, u_k)\Delta t;$$

wherein $J_1$ is an objective function of a fuel economy when a linear predictive control system is adopted, $v_k$ is a stage indicator of the $k^{th}$ stage, $x_k$ is a state variable of the $k^{th}$ stage, $u_k$ is a control variable of the $k^{th}$ stage, $\Delta t$ is a time interval, t(k) is a time point of the $k^{th}$ stage, and t(k+q) is a time point of the $(k+q)^{th}$ stage;

in a control region p, a sensing device is adopted for measurement; and in the prediction region q, a GPS/GIS system is adopted for a prediction;

a nonlinear predictive control is adopted to control state variables of the hydro-mechanical hybrid transmission system enabling both a power split and a convergence in each power range, constrain control variables, and estimate future states;

the objective function of minimizing the fuel consumption of the hybrid transmission system is:

$$J_2 = \min \sum_{t=t(k)}^{t=t(k+q)} L[x(t), u(t)];$$

wherein $J_2$ is the objective function of the fuel economy when a nonlinear predictive control system is adopted, and L is an instantaneous fuel consumption function at a time point t.

* * * * *